United States Patent
Ramakrishnan et al.

(10) Patent No.: US 10,152,398 B2
(45) Date of Patent: Dec. 11, 2018

(54) PIPELINED DATA REPLICATION FOR DISASTER RECOVERY

(75) Inventors: Kadangode K. Ramakrishnan, Berkeley Heights, NJ (US); Horacio Andres Lagar-Cavilla, Toronto (CA); Prashant Shenoy, Northampton, MA (US); Jacobus Van der Merwe, New Providence, NJ (US); Timothy Wood, Columbia, MD (US)

(73) Assignees: AT&T Intellectual Property I, L.P., Atlanta, GA (US); University of Massachusetts, Boston, MA (US)

( * ) Notice: Subject to any disclaimer, the term of this patent is extended or adjusted under 35 U.S.C. 154(b) by 815 days.

(21) Appl. No.: 13/565,494

(22) Filed: Aug. 2, 2012

(65) Prior Publication Data
US 2014/0040206 A1 Feb. 6, 2014

(51) Int. Cl.
*G06F 7/00* (2006.01)
*G06F 11/20* (2006.01)
*G06F 17/00* (2006.01)

(52) U.S. Cl.
CPC ...... *G06F 11/2097* (2013.01); *G06F 11/2094* (2013.01); *G06F 2201/82* (2013.01)

(58) Field of Classification Search
CPC . G06F 11/2074; G06F 9/5011; G06F 11/2071
See application file for complete search history.

(56) References Cited

U.S. PATENT DOCUMENTS

| | | | | |
|---|---|---|---|---|
| 5,826,072 A | * | 10/1998 | Knapp | G06F 9/30036 711/214 |
| 6,286,085 B1 | * | 9/2001 | Jouenne | G06F 11/2071 711/161 |
| 7,143,307 B1 | | 11/2006 | Witte et al. | |
| 8,103,906 B1 | | 1/2012 | Alibakhsh et al. | |
| 2003/0200387 A1 | * | 10/2003 | Urabe et al. | 711/113 |
| 2004/0073831 A1 | * | 4/2004 | Yanai | G06F 3/0601 714/6.32 |
| 2007/0022087 A1 | * | 1/2007 | Bahar et al. | 707/1 |

(Continued)

OTHER PUBLICATIONS

Aguilera et al., "Performance Debugging for Distributed Systems of Black Boxes," SOSP'03, Bolton Landing, New York, USA, Oct. 19-22, 2003 (16 pages).

(Continued)

*Primary Examiner* — Boris Gorney
*Assistant Examiner* — Christy Y Kim
(74) *Attorney, Agent, or Firm* — Hartmann & Citrin LLC

(57) ABSTRACT

Pipelined data replication for disaster recovery is disclosed. An example pipelined data replication method for disaster recovery disclosed herein comprises sending replicated first data from a primary processing environment to a secondary processing environment for backup by the secondary processing environment, the replicated first data being a replica of first data in the primary processing environment, processing the first data in the primary processing environment prior to the backup of the replicated first data by the secondary processing environment being confirmed, and preventing a result of the processing of the first data from being released by the primary processing environment until the backup of the replicated first data by the secondary processing environment is confirmed.

17 Claims, 15 Drawing Sheets

(56) References Cited

U.S. PATENT DOCUMENTS

| | | |
|---|---|---|
| 2010/0228819 A1 | 9/2010 | Wei |
| 2010/0332479 A1 | 12/2010 | Prahlad et al. |
| 2011/0161723 A1 | 6/2011 | Taleck et al. |
| 2011/0276713 A1* | 11/2011 | Brand .................... 709/232 |
| 2012/0017043 A1 | 1/2012 | Aizman et al. |
| 2012/0079222 A1* | 3/2012 | Phelps et al. ............ 711/162 |
| 2012/0084261 A1 | 4/2012 | Parab |
| 2012/0117422 A1 | 5/2012 | Radhakrishnan |
| 2012/0137173 A1 | 5/2012 | Burshan et al. |

OTHER PUBLICATIONS

AT&T, "AT&T Synaptic Storage as a Service," https://www.synaptic.att.com/clouduser/html/productdetail/Storage_as_a_Service.htm, accessed on Aug. 2, 2012 (7 pages).

Bessani et al., "DEPSKY: Dependable and Secure Storage in a Cloud-of-Clouds," EuroSys'11, Salzburg, Austria, Apr. 10-13, 2011 (15 pages).

Birrell et al., "Grapevine: An Exercise in Distributed Computing," Communications of the ACM, vol. 25, No. 4, Apr. 1982 (15 pages).

Bonvin et al., "A Self-Organized, Fault-Tolerant and Scalable Replication Scheme for Cloud Storage," SoCC'10, Indianapolis, Indiana, USA, Jun. 10-11, 2010 (12 pages).

Cully et al., "Remus: High Availability via Asynchronous Virtual Machine Replication," USENIX Association, NSDI'08: 5th USENIX Symposium on Networked Systems Design USENIX Association and Implementation (14 pages).

DataCenterKnowledge, "New York 'Donut' Boosts NJ Data Centers," http://www.datacenterknowledge.com/archives/2008/03/10/new-york-donut-boosts-nj-data . . . , accessed on Aug. 2, 2012 (2 pages).

DRBD, "DRBD: What is DRBD," http://www.drbd.org/, accessed on Aug. 2, 2012 (2 pages).

EMC Corporation, "White Paper: EMC CLARiiON Storage Solutions: Oracle Database 10g/11g/11gR2 with CLARiiON Storage Replication Consistency, Applied Technology," Aug. 2010 (26 pages).

EMC Corporation, "EMC® Symmetrix® Remote Data Facility (SRDF) Product Guide," P/N 300-001-165, Rev A05, Feb. 2007 (136 pages).

Ji et al., "Seneca: Remote Mirroring Done Write," USENIX Technical Conference, San Antonio, TX, Jun. 2003 (16 pages).

Keeton et al., "Designing for Disasters," FAST '04 Proceedings of the 3rd USENIX Conference on File and Storage Technologies, San Francisco, CA, 2004 (14 pages).

Ladin et al., "Providing High Availability Using Lazy Replication," ACM Transactions on Computer Systems, vol. 10, No. 4, Nov. 1992 (32 pages).

Lamport, Leslie, "Time, Clocks, and the Ordering of Events in a Distributed System," Communications of the ACM, vol. 21, No. 7, Jul. 1978 (8 pages).

Linux-Ha, "Heartbeat," http://linux-ha.org/wiki/Heartbeat, accessed on Aug. 2, 2012 (1 page).

Mattern, Friedemann, "Virtual Time and Global States of Distributed Systems," Elsevier Science Publishers B. V., Proceedings of the International Workshop on Parallel and Distributed Algorithms, Chateau de Bonas, France, Oct. 1988 (15 pages).

Minhas et al., "RemusDB: Transparent High Availability for Database Systems," The 37th International Conference on Very Large Data Bases, Proceedings of the VLDB Endowment, vol. 4, No. 11, Seattle, Washington, Aug. 29-Sep. 3, 2011 (11 pages).

Nightingale et al., "Rethink the Sync," ACM Transactions on Computer Systems, vol. 26, No. 3, Sep. 2008 (26 pages).

Patterson et al., "SnapMirror: File System Based Asynchronous Mirroring for Disaster Recovery," USENIX Association, Proceedings of the Fast 2002 Conference on File and Storage Technologies, Monterey, California, USA, Jan. 28-30, 2002 (14 pages).

RightScale Blog, "Amazon EC2 Outage: Summary and Lessons Learned," http://blog.rightscale.com/2011/04/25/amazon-ec2-outage-summary-and-lessons-learned/, posted on Apr. 25, 2011, accessed on Aug. 2, 2012 (18 pages).

Shamma et al., "Capo: Recapitulating Storage for Virtual Desktops," USENIX Association, Proceedings of ,the 9th USENIX Conference on File and Storage Technologies (FAST'11), San Jose, California (15 pages).

Strom et al., "Optimistic Recovery in Distributed Systems," ACM Transactions on Computer Systems, vol. 3, No. 3, Aug. 1985 (23 pages).

Terry et al., "Managing Update Conflicts in Bayou, a Weakly Connected Replicated Storage System," Proceedings of the 15th ACM Symposium on Operating Systems Principles (SOSP '95), New York, NY, USA, Dec. 1995 (12 pages).

Weatherspoon et al., "Smoke and Mirrors: Reflecting Files at a Geographically Remote Location Without Loss of Performance," USENIX Association, 7th USENIX Conference on File and Storage Technologies (FAST '09), San Francisco, California, 2009 (14 pages).

Wester et al., "Tolerating Latency in Replicated State Machines through Client Speculation," Proceedings of the 6th USENIX Symposium on Networked Systems Design and Implementation (NSDI'09), Boston, Massachusetts, 2009 (16 pages).

Wylie et al., "Selecting the Right Data Distribution Scheme for a Survivable Storage System," Carnegie Mellon University School of Computer Science Technical Report CMU-CS-01-120, May 2001 (23 pages).

Wood et al., "Disaster Recovery as a Cloud Service: Economic Benefits & Deployment Challenges," in Proc. of HotCloud, Boston, MA, Jun. 2010 (7 pages).

Wood et al., "PipeCloud: Using Causality to Overcome Speed-of-Light Delays in Cloud-Based Disaster Recovery," ACM Symposium on Cloud Computing 2011, Oct. 27-28, 2011 (13 pages).

* cited by examiner

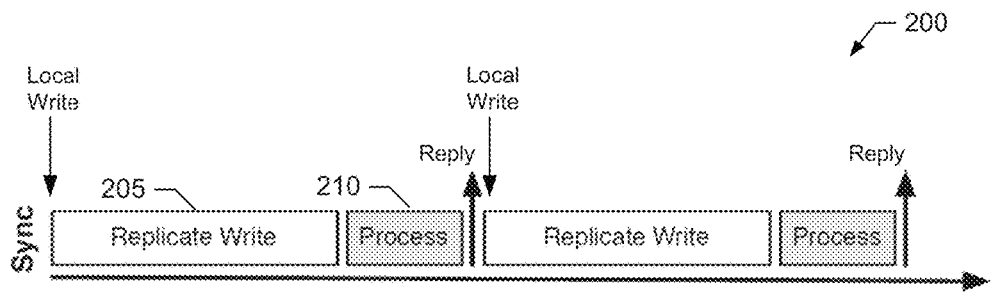
FIG. 2
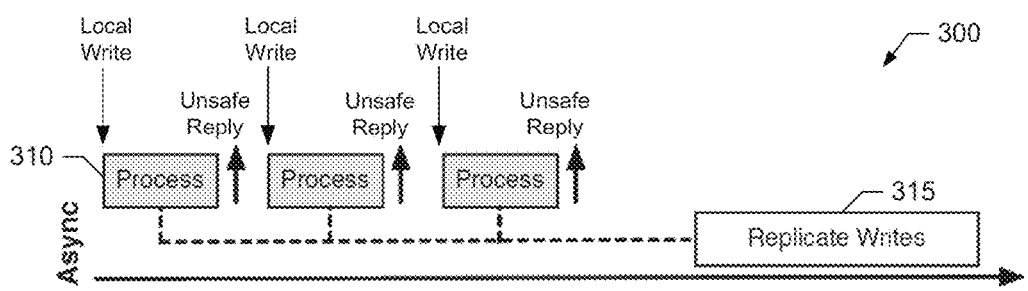
FIG. 3
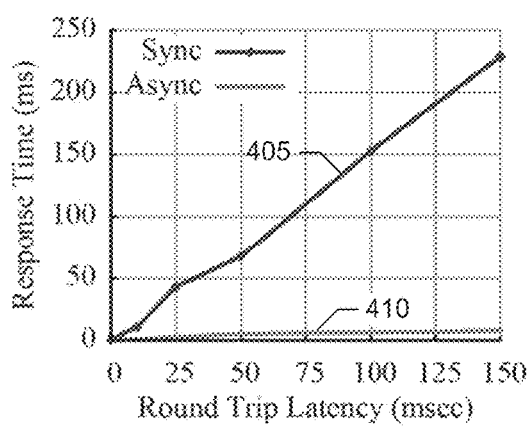
FIG. 4A
| Location | RTT (ms) | Distance (km) |
|---|---|---|
| Virginia | 16 | 567 |
| California | 106 | 4,250 |
| Ireland | 92 | 4,917 |
| Singapore | 281 | 15,146 |
FIG. 4B

PIPELINED DATA REPLICATION FOR DISASTER RECOVERY

FIELD OF THE DISCLOSURE

This disclosure relates generally to disaster recovery and, more particularly, to pipelined processing and data replication for disaster recovery.

BACKGROUND

Businesses and government enterprises utilize disaster recovery (DR) systems to reduce (e.g., minimize) data loss and downtime incurred by catastrophic system failures. Existing DR mechanisms range from periodic tape backups that are trucked offsite to continuous synchronous replication of data between geographically separated sites. Typical DR solutions utilize one or more secondary sites (e.g., a secondary replica site, such as a secondary data center) to backup their primary sites, as well as high bandwidth links to the secondary sites, thereby incurring potentially high infrastructure costs. Additionally, the geographic separation between the primary site(s) and the secondary replica site(s) should be large enough to support DR in the face of any expected disaster. However, the resulting communication latency between geographically separated sites can significantly impact the performance of DR systems.

BRIEF DESCRIPTION OF THE DRAWINGS

FIG. 2 illustrates an example operation of synchronous data replication for disaster recovery.

FIG. 3 illustrates an example operation of asynchronous data replication for disaster recovery.

FIGS. 4A-B illustrate example latency characteristics of an example synchronous data replication implementation.

DETAILED DESCRIPTION

Figure 1:
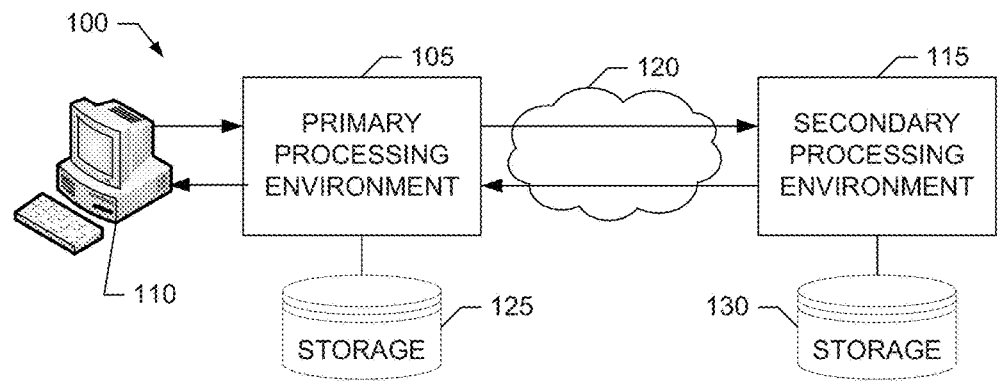
FIG. 1 is a block diagram of a first example system supporting pipelined data replication for disaster recovery.

Pipelined data replication for disaster recovery is disclosed herein. An example system 100 supporting pipelined data replication for disaster recovery is illustrated in FIG. 1. The system 100 of the illustrated example includes an example primary processing environment 105, also referred to as a primary processing site, a primary site, etc., that receives processing requests from one or more example client(s) 110. The primary processing environment 105 processes the client requests and returns replies to the client(s) 110 containing the processing results. For example, the primary processing environment 105 can include a web server front-end to receive requests from and send associated replies to the client(s) 110. Such an example primary processing environment 105 can further include one or more application servers and one or more database servers to process the requests received from client(s) 110 to generate the processing results to be sent back to the client(s) 110. The client(s) 110 can be implemented by any type of computing device, such as a personal computer, a terminal, a notebook computer, a tablet computer, a smartphone, etc., and/or any associated client application executing thereon. In some examples, the client(s) 110 can be connected over one or more networks, such as the Internet, to the primary processing environment 105.

To support pipelined data replication for disaster recovery, which is described in greater detail below, the primary processing environment 105 of the example system 100 replicates data associated with client requests and sends the replicated data from the primary processing environment 105 to an example secondary processing environment 115 for backup by the secondary processing environment 115. The secondary processing environment 115 is also referred to as a secondary processing site, a secondary site, a secondary data center, a replication site, a disaster recovery site, etc. In the illustrated example, the primary processing environment 105 and the secondary processing environment 115 communicate via an example network 120, which may be implemented by any type(s), number and/or combination of local area networks (LANs), wide area networks (WANs), etc. Because the example system 100 implements pipelined data replication as described below, the data that is to be backed up continues to be processed in the primary processing environment 105 while the replicated data is being backed up or, in other words, prior to the backup of the replicated data by the secondary processing environment 115 being confirmed. However, to maintain application consistency, the primary processing environment 105 prevents the result of processing the data from being released to the client(s) 110 until the backup of the replicated data by the secondary processing environment 115 is confirmed. The foregoing description is an example of a pipelined synchrony case disclosed herein. For comparison, in the traditional synchronous replication approach, an application at the primary processing environment 105 waits for the replicated data to be written to storage, and to be confirmed by the secondary processing environment 115 back over the network, before the application at the primary processing environment 105 continues processing.

As described in greater detail below, in some examples, the system 100 implements pipelined data replication by tracking an order of data writes to an example local storage 125 in the primary processing environment 105 (e.g., which include the data writes storing the data associated with client requests to the local storage 125). The data stored in the local storage 125 is to be replicated for backup by the secondary processing environment 115 in an example remote storage 130. The local storage 125 and the remote storage 130 can be implemented by any type of a storage or memory device, a database, etc., such as the mass storage device 2228 and/or the volatile memory 2214 included in the example processing system 2200 of FIG. 22, which is described in greater detail below. As described in greater detail below, the primary processing environment 105 enables pipelined data replication by preventing a reply (e.g., containing processing results associated with client requests) from being released to the client(s) 110 until the secondary processing environment 115 confirms the backup of the replicated data corresponding to the local data writes that preceded the reply.

In some examples, the system 100 uses counter values that are updated by the primary and secondary processing environments 105 and 115 to confirm whether the secondary processing environment 115 has performed the backup of the replicated data corresponding to a reply that is to be released to the client(s) 110. In such examples, and as described in greater detail below, the primary processing environment 105 increments a first counter value (e.g., a write counter value) when the data is written to the local storage 125. In such examples, the primary processing environment 105 also tags a reply data packet, which is to be released to the client 110 and contains the result of processing the data, with a tag value that is based on the first counter value (e.g., to track the local data writes that have occurred prior to preparing the reply data packet). In such examples, the primary processing environment 105 further prevents the reply data packet from being released to the client 110 until a second counter value (e.g., a commit counter value) provided by the secondary processing environment 115 is greater than or equal to the tag value. The second counter value is incremented by the secondary processing environment 115 when replicated data is committed to the remote (e.g., backup) storage 130.

In some examples, the first and second counter values discussed above further include respective values of respective first and second count vectors. For example, the first count vector can include multiple elements to count local data writes corresponding to respective processing nodes in the primary processing environment 105, and the second count vector can include multiple elements to be incremented by the secondary processing environment 115 when replicated data corresponding to the local data writes performed by the respective processing nodes in the primary processing environment 105 is committed to the backup storage 130. In such examples, the primary processing environment 105 prevents a reply data packet from being released to the client 110 until the elements of the second counter value are greater than or equal to the respective elements of a tag value associated with the reply packet (where the tag value is based on the first counter value, as mentioned above).

Further example methods to perform pipelined data replication for disaster recovery, example apparatus to implement pipelined data replication for disaster recovery, and example articles of manufacture (e.g., storage media) storing machine readable instructions which, when executed, cause example machine(s) to perform pipelined data replication for disaster recovery, are also disclosed herein.

In some examples, the secondary processing environment to which replicated data is to be backed up for disaster recovery (e.g., such as the secondary processing environment 115 of FIG. 1) is provided by a cloud computing service. The recent emergence of commercial cloud computing has made cloud data centers an attractive option for implementing cost-effective disaster recover (DR) due to their resource-on-demand model and high degree of automation. During normal operation, the cost of providing DR in the cloud can be minimized, and additional resources can be brought online and purchased only when a disaster actually occurs. In addition, the cloud platform's ability to rapidly activate resources on-demand helps minimize the recovery cost after a disaster. The automation that is designed into accessing cloud services enables the DR service to support business continuity, with substantially lower recovery times than traditional non-cloud-based services.

Despite these attractive economics, a major barrier to using cloud data centers for DR is their large geographic separation from primary sites. For example, the increased latency in communicating with distant cloud sites can become a major performance bottleneck. This is amplified by the limited control cloud users have over the actual placement of their cloud resources. Consequently, prior synchronous replication schemes would expose every data write to the performance impact of this wide-area latency, forcing system administrators to seek alternative solutions. Often, such alternatives trade-off loss of data for performance by using prior asynchronous replication techniques, in which a consistent snapshot is replicated to the backup site. Asynchronous replication improves performance because the primary site can proceed without waiting for the replication to complete. However, disk writes at the primary site that are subsequent to the last replicated snapshot will be lost if a disaster occurs. Consequently, to implement cloud-based DR for mission-critical business applications, a mechanism that combines the performance benefits of asynchronous replication with the no-data-loss consistency guarantee of synchronous replication is desired.

Pipelined data replication as disclosed herein is such an approach that can provide high performance disaster recovery services over WAN links connecting enterprises and cloud platforms. Pipelined data replication targets client-server style applications, and exploits the observation that an external client is primarily concerned with a guarantee that data writes related to its requests are committed to storage (both at the primary and the secondary sites) before a response is received from the system. Because it can potentially take a large amount of time for the secondary site to receive the replicated data to be backed up, commit the replicated data to storage and provide an acknowledgment, there is a substantial opportunity to overlap processing during this time interval, which synchronous data replication approaches ignore. The opportunity is even more compelling in multi-tier applications, which can take advantage of pipelined data replication by overlapping remote data replication with complex processing across the multiple tiers that are typical in such environments. A key challenge in designing pipelined data replication is to efficiently track all writes triggered by processing of a request as the request propagates through the (e.g., multi-tier) system, and to inform the external entity (e.g., the client) only when all these writes have been made durable (e.g., have been backed-up) by the secondary site. Pipelined data replication achieves this by holding up network packets destined for the client until all disk writes that occurred concurrently with request processing have been acknowledged by the backup. This approach imposes causality across externally-bound network packets and disk writes, providing the same consistency guarantee as if the disk writes had been performed synchronously. To implement pipelined synchrony in an Infrastructure-as-a-Service (IaaS) cloud environment that relies on Virtual Machines (VMs) to encapsulate user applications, pipelined data replication as disclosed herein also supports black-box techniques when providing cloud-based DR.

As described in greater detail below, pipelined data replication exploits cloud resources for a cost-effective disaster recovery service. For example, pipelined data replication system offers clients synchronous consistency guarantees at much lower performance cost by pipelining request processing and write propagation. In some examples, pipelined data replication also employs a communication-based data replication scheme that allows the state of distributed or multi-tier applications to be replicated in a consistent manner. In some examples, pipelined data replication efficiently protects the disks of virtual machines without any modifications to the running applications or operating system. Example performance results discussed in greater detail below further illustrate the potential performance benefits of using pipelined data replication for disaster recovery instead of traditional synchronous or asynchronous approaches.

Two metrics that can be used to characterize the capabilities of a DR system are the recovery point objective (RPO) and the recovery time objective (RTO). The RPO refers to the acceptable amount of application data that can be lost due to a disaster. For example, a zero RPO means that no data can be lost. The RTO refers to the amount of downtime that is permissible before the system recovers. A zero RTO means that failover is to be instantaneous and transparent and is typically implemented using hot standby replicas.

In scenarios where a small downtime is tolerable (e.g., RTO>0), the cost of DR can be reduced substantially by eliminating hot standbys. The limiting factors in optimizing the RTO in such scenarios depend on various engineering considerations, such as (1) how swiftly hardware resources can be provisioned at the backup site to recreate the application environment, (2) the bootstrapping latency for the application software environment after resources have been provisioned, (3) whether a recovery procedure, such as a file system check, is necessary to ensure that the preserved application data is in a usable state, etc. As noted earlier, leveraging cloud automation can significantly improve the RTO metric. Furthermore, the cloud's economics, which are driven by on-demand resource utilization, are a good fit for substantially lowering the cost of DR deployments.

In the following, the impact of latency between the primary and secondary sites on the RPO that can be achieved with different replication strategies is discussed. Also, a broader RPO definition, which takes into consideration the client's view of a DR system, is introduced.

When preserving stored data to a secondary site, the network round trip time (RTT) between the primary and secondary sites can impact the choice of replication algorithm, and thus, the ability to provide an RPO as close as possible to zero (which corresponds to the no data loss condition). In the past, latency considerations have led to a choice between two primary modes of data replication for disaster survivability: synchronous versus asynchronous replication. FIGS. 2 and 3 illustrate respective example synchronous and asynchronous data replication operations 200 and 300 for disaster recovery. As shown in the example of FIG. 2, in the synchronous replication operation 200, local data writes are not reported as complete in the primary site until their respective replicated data writes 205 have succeeded in the secondary site. Processing 210 of the data may proceed in the primary site only after the respective replicated data writes 205 are reported as complete. However, in the asynchronous replication operation 300, data writes only need to succeed locally for processing 310 of the data to commence. In the asynchronous replication operation 300, the replicated data writes 315 are trickled back opportunistically to the secondary site.

With synchronous data replication, applications can obtain an RPO of zero because application progress is prevented until data has been persisted (e.g., backed up) remotely. However, this higher latency results in a corresponding increase in the response time and a lower throughput for client-server/database and various other types of applications. FIGS. 4A-B show an example performance impact of increasing the latency between the primary and secondary (e.g., backup) sites when using existing synchronous versus asynchronous data replication. The example performance results of FIGS. 4A-B were derived using DRBD® (see http://www.drbd.org), which is a replication tool that supports both synchronous and asynchronous data replication, to protect a MySQL™ database (see http://www.mysql.com). As shown in the example of FIG. 4A, the response time 405 of performing inserts into the database increases linearly with increasing RTT for synchronous data replication, whereas the response time 410 for asynchronous data replication remains relatively flat with increasing RTT. Even for relatively short distances, such as from Massachusetts to the Amazon EC2 data center in Virginia, which has an RTT of 16 msec. according to the example of FIG. 4B, the response time 405 for synchronous data replication degrades noticeably relative to the response time 410 for asynchronous replication. For these reasons, while mission-critical applications may need to resort to synchronous replication, they incur a high performance cost. To mitigate this overhead, the secondary site is often chosen to be geographically close (within tens of kilometers) to the primary site. However, replication to nearby facilities is unlikely to withstand many kinds of disasters that can strike the primary site's infrastructure, such as hurricanes, earthquakes and tsunamis, regional energy blackouts, etc.

Asynchronous data replication sacrifices RPO guarantees, as illustrated by the unsafe replies indicated in the example asynchronous data replication operation of FIG. 3. However, asynchronous data replication also decouples application performance from data preservation. Thus, asynchronous data replication implementations can be tailored to make tradeoffs among replication frequency, application RPO demands, financial outlay by application owners, etc. However, asynchronous data replication exposes applications to a risk of inconsistency. For example, clients may be notified of a request having completed even though the data associated with the request has not yet been preserved at the backup and may be lost in the case of a disaster. Further, the number of unsafe replies increases as latency rises because the state of the data backup lags further behind the local data state at the primary site.

To further illustrate the impact of a given replication algorithm on application consistency, the notion of client RPO guarantees is formalized herein. In particular, three views of an application's consistency state are defined, namely, the primary site view (PV), the secondary site view (SV), and the external clients view (CV). Examples of the relationships between these views of an application's consistency state are illustrated in FIG. 5.

Figure 5:
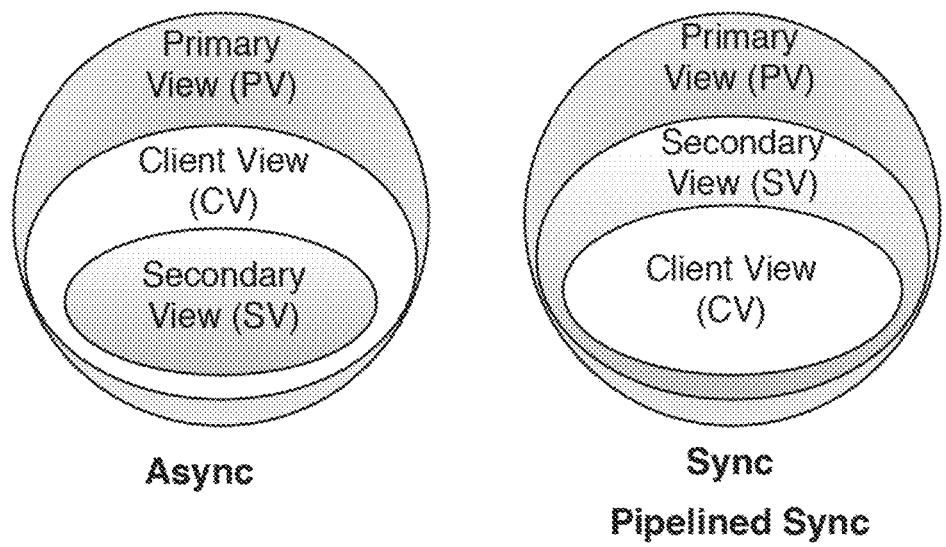
FIG. 5 illustrates example application consistency views for asynchronous data replication, synchronous data replication and pipelined data replication.

As illustrated in FIG. 5, for both synchronous and asynchronous data replication, the SV is a subset of the PV. This is because the SV lags in time behind the PV, and reflects a past state of the application data. For asynchronous data replication, the difference between SV and PV can be arbitrarily large. For synchronous replication, the difference between SV and PV is at most one write (or one logical write, such as when a set of scatter-gather DMA writes are issued concurrently as one single logical packet) because an application cannot make further progress until that write is made durable at the secondary site. In both synchronous and asynchronous data replication, the CV is also a subset of the PV, because the primary site performs local processing before updating its clients.

As further illustrated in FIG. 5, a key distinction between synchronous and asynchronous data replication can be found in the difference between CV and SV. In asynchronous data replication, client requests are acknowledged before writes are made durable, and thus the SV is a subset of the CV, reflecting the non-zero RPO. In synchronous replication, client requests are acknowledged only after writes have been persisted remotely and, thus, the CV is a subset of the SV. As also shown in FIG. 5, pipelined data replication, which is disclosed herein, maintains similar client RPO guarantees as with synchronous data replication.

Pipelined data replication, as disclosed herein, can be used with an enterprise primary site that is, for example, a modern virtualized data center and a secondary site that is, for example, a cloud data center, such as a cloud site that supports Infrastructure-as-a-Service (IaaS) deployments through the use of system virtualization. The primary site may run multiple applications inside virtual machines (VMs). Applications may be distributed across multiple VMs, and one or more of these VMs may write data to disks that require DR protection. Data on any disk requiring DR protection is replicated using pipelined data replication to the secondary site while ensuring the same client RPO guarantees as synchronous data replication. Pipelined data replication assumes that a small, non-zero RTO can be tolerated by the application, thereby allowing cloud automation services to be leveraged to dynamically start application VMs after a disaster. Pipelined data replication can be implemented to treat application VMs as black-boxes and, thus, does not require specific software or source code changes for the purposes of disaster recovery. As such, pipelined data replication is broadly applicable and application-agnostic, and the price of this choice is the limited black-box visibility into the application that can be afforded at the VM level. However, pipelined data replication can also be implemented at the application level. Furthermore, pipelined data replication typically assumes that applications first issue a write to storage, ensure such write has been flushed from memory to the disk controller, and only then reply to a client with the result of an operation.

Given the WAN latencies between a primary processing site and a secondary cloud site, pipelined data replication provides a replication mechanism, as part of an overall DR solution that combines the performance benefits of asynchronous replication with the consistency guarantees of synchronous replication. To do so, pipelined data replication leverages the overlapping of replication and processing that is typical of asynchronous replication, while retaining the inherent safety of synchronous replication.

The following two observations are useful in understanding pipelined data replication. First, from the perspective of an external client, it does not matter if the transmission of the write and the processing overlap as long as the client is guaranteed that the data writes are durably committed to the backup before the client receives a reply. Second, the potential for performance improvements compared to synchronous replication is substantial when there is a large replication write delay that can be overlapped, as is the case of DR systems with high WAN latencies. The case becomes stronger for multi-tiered applications and, more generally, clustered applications or distributed systems interfacing with external clients via some form of frontend. Such applications often involve complex processing across multiple tiers or components.

Figure 6:
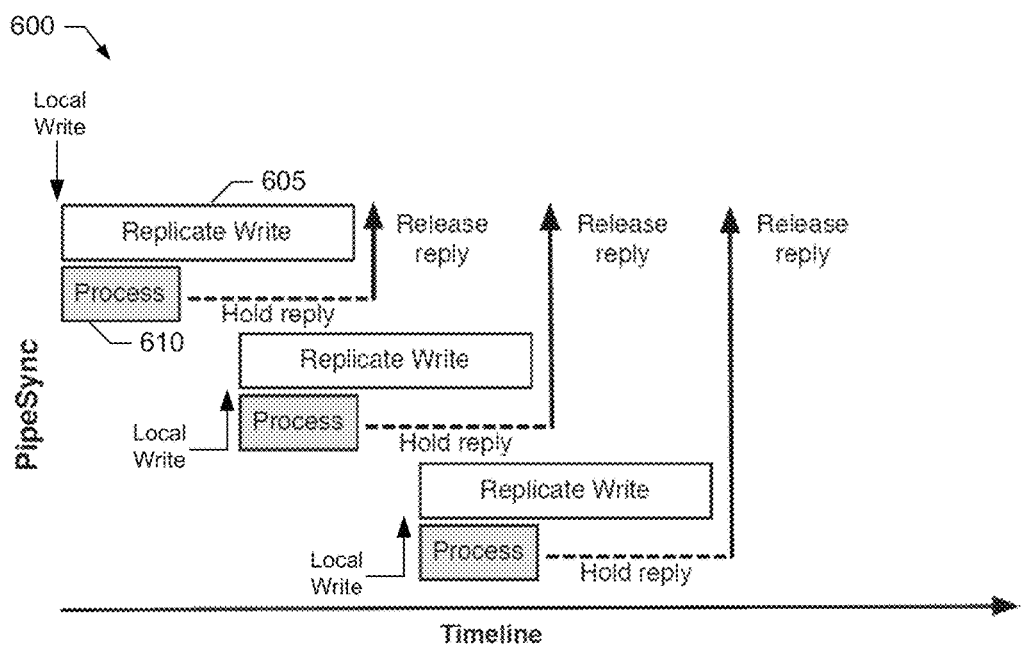
FIG. 6 illustrates an example operation of pipelined data replication for disaster recovery.

In general terms, pipelined data replication involves blocking on an externally visible event until all writes resulting from the (e.g., distributed) computation that generated the external event have been committed to disk at both the primary site and the secondary (e.g., backup) site. When processing a request (e.g., received at the primary site from a client), pipelined data replication allows overlapping of computation and remote writes such that writes to the secondary site are asynchronous and pipelined with the remote writes to backup storage performed by the secondary site, thereby allowing subsequent processing at the primary site to proceed while the data is still being backed up at the secondary site. However, upon generating an externally visible event (such as a network packet or a reply to the processing request), pipelined data replication involves blocking the event and not releasing it to the client until all pending writes associated with the event have finished. As such, pipelined data replication mitigates the performance penalties associated with speed-of-light delays by overlapping or pipelining computation and remote writes, as in asynchronous replication, while ensuring the same relation between client view and secondary view, as in synchronous replication. FIG. 6 illustrates an example operation 600 of pipelined data replication for disaster recovery, which demonstrates the overlapping (or pipelining) of replicated writes 605 performed by the secondary site with the processing 610 performed by the primary site.

Figure 7:
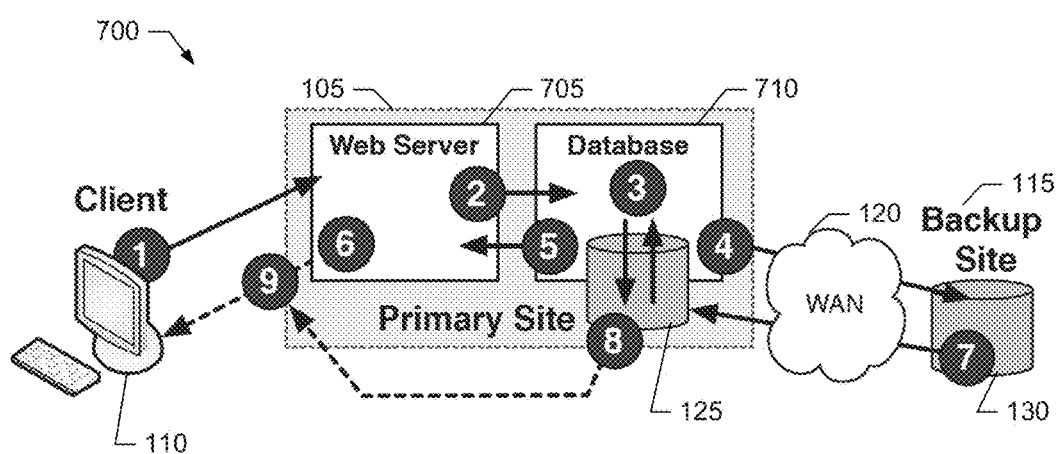
FIG. 7 is a block diagram of a second example system supporting pipelined data replication for disaster recovery.

To further compare pipelined data replication with existing replication strategies, FIG. 7 illustrates a block diagram of a second example system 700 supporting pipelined data replication for disaster recovery. The example system 700 includes the example primary processing environment 105, the example client 110, the example secondary processing environment 115, the example network 120, the example local storage 125 and the example remote storage 130 of FIG. 1. Accordingly, the detailed descriptions of these elements are provided above in connection with the discussion of FIG. 1 and, in the interest of brevity, are not repeated in the discussion of FIG. 7. In the system 700 of FIG. 7, the primary processing environment 105 further includes an example frontend web server 705 and an example backend database 710. The web server 705 can be implemented by any type(s) and/or number of web servers, and the database 710 can be implemented by any type(s) and/or number of databases.

An example operation of the pipelined data replication system 700 is further illustrated in FIG. 7. In the illustrated example operation of the system 700, a user uses the client 110 to purchase a ticket from a travel website implemented by the primary processing environment 105, and submits her credit card information in step 1. The user, via the client 110, interacts with the frontend web server 705, which processes and forwards the request on to the backend database 710 (step 2) to record the user's purchase. In step 3, the database 710 writes the transaction to the local disk 125. Because this is a critical state of the application, in step 4 the disk write is also replicated across the WAN link 120 to the secondary processing environment 115 (e.g., the backup site 115) to be preserved. If synchronous replication was employed by the system 700, the system 700 would wait for the replication to complete (e.g., by waiting for the acknowledgement from the backup site 115, corresponding to step 7 in FIG. 7) before continuing processing (corresponding to step 5 in FIG. 7) and responding to the client 110 (corresponding to step 6 in FIG. 7). If asynchronous replication was employed by the system 700, the system 700 would immediately continue with steps 5 and 6 after the data write performed by the database 710 has succeeded locally, and would defer the replication in step 4 for a later time. In contrast, with pipelined data replication, the transfer of the replicated data to the backup site 115 in step 4 is performed immediately yet asynchronously, allowing the database 710 to return its reply to the frontend web server 705 in step 5 concurrently. The frontend web server 705 continues processing the request by, for example, combining the ticket information with a mashup of maps and hotel availability. Eventually, in step 6, the frontend web server 705 produces a reply to return to the user via the client 110. However, because pipelined data replication is implemented by the system 700, this reply cannot be returned to the client 110 until the database write it was based on has been persisted to the backup site 115. In other words, only after step 7 completes and the backup site 115 has acknowledged the write as complete can the reply to the client 110 be released (step 8) and returned to, for example, the client's web browser to display the purchase confirmation to the user (step 9).

The use of pipelined data replication in the system 700 means that steps 5 and 6, which may include significant computation cost in the primary processing environment 105, can be performed in parallel with the propagation of the disk write to the backup site 115. This can provide a substantial performance gain compared to synchronous data replication, which must delay this processing in the primary processing environment 105 for the length of a network round trip. In the illustrated example, because pipelined data replication defers replying to the client 110 until after the write is acknowledged in step 7, the user of the client 110 is guaranteed that the data her reply is based on has been durably committed to the backup site 115.

Thus, a key challenge in pipelined data replication is to track which durable write requests (e.g., the data write requests that are to be persisted/backed-up to the secondary site) are causally related to (e.g., dependent on) which externally-visible network packets. In other words, pipelined data replication operates to guarantee a causal ordering between externally-visible and durable events such that, if a write request happened before a network packet was generated, then the write is expected to complete before the packet is released.

To intuitively understand how such dependencies can be tracked, first assume an example in which a global clock is included in the system 700. Further assume that every write is time-stamped using this global clock. In such an example, a total ordering of all events can be obtained. Hence, if a network packet is generated at time t, then it is sufficient to hold this packet at the primary processing environment 105 until all disk writes that have a timestamp ≤t have finished at the secondary processing environment 115. In some examples, not all of these writes are causally related to the network packet. However, by waiting for all previously issued writes to complete at the secondary processing environment 115, the system 700 can ensure that all writes causally related to the particular network packet held by the primary processing environment 105 will have finished being backed-up, thereby ensuring safety.

In practice, a multi-tier application may not have access to a global clock. Thus, in some examples disclosed herein, pipelined data replication performs the foregoing time-stamping using logical clocks to identify and track causally dependent writes in multi-tier distributed applications. Some examples further support such time-stamping in the context of providing black box protection of VMs. For example, in a single VM application, the local machine clock may be used as a global clock, which may be used for tracking writes that are causally dependent on a network packet. Such an approach can be extended to support multi-tier applications with only a single protected writer, but becomes more complex for multi-tier multi-writer applications. Accordingly, the following examples first describe the case of providing pipelined data replication for DR protection to a multi-tier application with a single writer, and then generalized to the multi-tier, multi-writer case.

Figure 8:
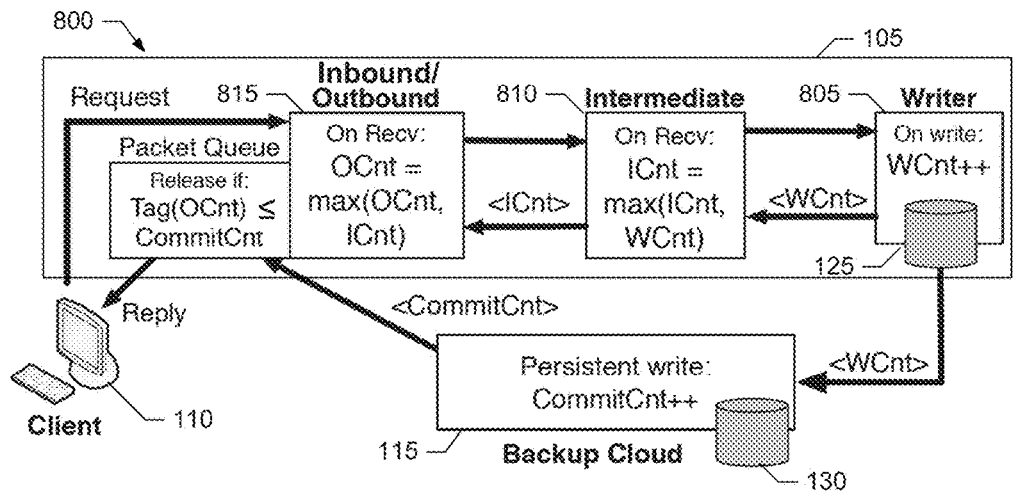
FIG. 8 is a block diagram of a third example system supporting pipelined data replication for disaster recovery.

FIG. 8 illustrates a block diagram of a third example system 800 supporting pipelined data replication multi-tier applications with only a single protected writer. The example system 800 includes the example primary processing environment 105, the example client 110, the example secondary processing environment 115, the example local storage 125 and the example remote storage 130 of FIG. 1. Accordingly, the detailed descriptions of these elements are provided above in connection with the discussion of FIG. 1 and, in the interest of brevity, are not repeated in the discussion of FIG. 8. The example system 800 further implements a multi-tier web service including, for example, an Apache™ server, an application, and a database server setup (e.g., in the form of a "LAMP" stack). Most services structured in this way use web server(s) as frontends to serve static content, application server(s) to manipulate session-specific dynamic content, and a database as a data backend. In the illustrated example, the only tier that is to be protected for disaster recovery is the database. Because the system 800 implements pipelined data replication, further processing performed by the upper tiers can be overlapped with the replication of the database writes.

To protect the application's state while allowing computation to overlap, pipelined data replication tracks which outbound network packets (externally visible events) from the primary processing environment 105 depend on specific storage writes that are to be made durable at the backup site 115. In the illustrated example, pipelined data replication is implemented in the virtual machine monitor (VMM) of each physical server and is able to monitor the disk writes and network packets being produced by the VMs. In particular, pipelined data replication, as implemented in the system 800, is to (i) replicate all disk writes at the primary site 105 to the backup site 115, (ii) track the order of disk writes at the primary site 105 and the dependencies of any network interaction (e.g., network packets generated) on such writes and (iii) prevent outbound network packets from being released by the primary site 105 until the local writes that preceded them have been committed to the backup site 115.

In the illustrated example of FIG. 8, the pipelined data replication procedure described above relies on being able to propagate information about disk writes in the communication messages exchanged between tiers of the primary processing environment 105. For example, the primary processing environment 105 in the example system 800 of FIG. 8 is divided into tiers (also referred to as nodes) along three roles, namely, an example writer (e.g., database) tier 805 (e.g., corresponding to a backend database), an example intermediate (e.g., application) tier 810 (e.g., corresponding to an application) and an example inbound/outbound (e.g., web server) tier 815 (e.g., corresponding to a frontend web server). Although the example system 800 includes one intermediate tier 810 and one outbound tier 815, any number of intermediate and/or inbound/outbound tiers could be included in the example system 800. In the illustrated example, each processing tier maintains its own logical pending write counter, denoted as WCnt, ICnt and OCnt in FIG. 8. Note that WCnt represents the true count of writes performed by the writer tier 805 to the local disk 125, while OCnt and ICnt represent the (possibly outdated) view of the disk state by the other tiers 810-815. In the example system 800, the backup site 115 maintains a committed write count, denoted as CommitCnt in FIG. 8. These counters are similar to monotonically increasing logical clocks and, thus, the terms counters and clocks are used interchangeably unless noted otherwise.

Without loss of generality, assume all of the counters in the system 800 are set to zero when the system 800 receives a first client request. The client request propagates through the tiers 805-815, ultimately resulting in a database update at the writer tier 805. The writer tier 805 increases the value of its pending counter (WCnt) after it has performed a local write, and before that write is propagated to the backup site 115. In the example system 800, each tier 805-815 appends the current value of its respective pending write counter (e.g., WCnt, ICnt and OCnt, respectively) to its communications with other elements in the system 800. For example, the writer tier 805 propagates its pending write counter (WCnt) through the intermediate and outbound tiers 810-815 so they can update their local views of the pending writes in the system 800. Furthermore, the pending counter (e.g., ICnt and OCnt) at each non-writer tier (e.g., at the intermediate and outbound tiers 810 and 815) is updated to be the maximum of its own pending write counter value, and any pending counter values it receives from other tiers.

On receiving a write request from the writer tier 805 at the primary site 105, the DR system at the backup site 115 of the example system 800 commits the write to the backup disk 130 and then increases its committed write counter (CommitCnt). The current value of the committed counter (CommitCnt) is then communicated back to the outbound tier(s) 815 at the primary site 105.

In the example system 800, the outbound tier 815 of the primary processing environment 105 implements a packet buffering mechanism, and tags packets destined to the external clients 110 with a tag value equal to the value of its pending writer counter, OCnt, as this represents the number of system writes which could have causally preceded the packet's creation. Packets are released by the outbound tier 815 from its queue only when their pending clock tag is less than or equal to the committed clock (CommitCnt) received from the backup site 115. This guarantees that clients 110 only receive a reply once the data it is dependent on has been backed-up at the backup site 115. Note that protection of a single VM is covered by foregoing scheme as the single VM can be treated as both the writer tier 805 and the outbound tier 815.

Figure 9:
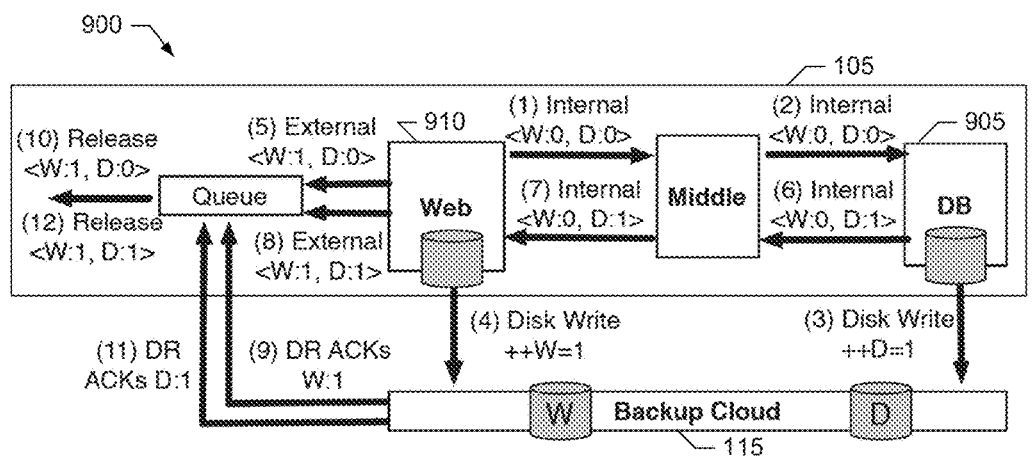
FIG. 9 is a block diagram of a fourth example system supporting pipelined data replication for disaster recovery.

FIG. 9 illustrates a block diagram of a fourth example system 900 supporting pipelined data replication for multi-tier applications with multiple protected writers. The example system 900 includes the example primary processing environment 105 and the example secondary processing environment 115 of FIG. 1. Accordingly, the detailed descriptions of these elements are provided above in connection with the discussion of FIG. 1 and, in the interest of brevity, are not repeated in the discussion of FIG. 9. In the example system 900, the primary processing environment 105 includes multiple nodes (tiers) that cooperate, and more than one of the nodes issue writes that are to be persisted (e.g., backed-up) by the secondary processing environment 115. Example applications supported by the system 900 include a LAMP stack with a master-master database replication scheme or a NoSQL-style replicated key-value store.

Pipelined data replication is implemented in the example system 900 by extending the notion of a logical counter to a logical count vector maintained by each node (tier). The count vector maintained by each node is different from typical vector clocks that are updated on every message send or receive because the example count vectors implemented by the system 900 count only disk write events. For example, the pending write count for node (tier) i in the system 900 is a vector $P_i = \langle p_1, \ldots, p_n \rangle$, that contains an entry for each of the n writers in the system 900. When issuing disk writes, a writer node i increments its local counter in $P_i[i]$. All outgoing packets are tagged using the current value of the outgoing node's count vector of pending writes. Furthermore, local knowledge is updated at each node by updating the node's local count vector with the count vector values included in the communications between each of the tiers/nodes in the multi-tier application, with each entry in the node's local count vector becoming the maximum of the respective existing and arriving entry from the other tiers (thereby propagating count vector information from tier to tier). By exchanging information about writes in this way, the entry $P_i[j]$ of a count vector indicates the number of writes started by node j of which node i is aware. Thus, at any given time, the pending count vector represents the write frontier for node i, where the write frontier refers to the set of writes at the node itself and at other nodes that any computation or network packet might be causally dependent on. Note that non-writer nodes do not increment write counts, but instead only merge count values on reception of the internal communications between tiers, and that the single-writer case corresponds to a single-entry count vector.

In this manner, causality spreads across the system 900 in a gossiping/anti-entropy manner, all the way to outbound packets. As before, an outbound packet is tagged in the system 900 with the value of outbound node's pending count vector when the packet is created and/or saved in the outbound queue for release to the appropriate client. Outbound nodes also maintain count vectors of committed writes $C_i = \langle c_1, \ldots, c_n \rangle$, which are reported by the backup site 115 and represent the set of writes known to have been safely persisted. A client-bound packet can be released by the primary processing site 105 only after every entry in the committed count write vector, $C_i$, reported by the backup site 115 is greater than or equal to the respective element in that packet's tag. This approach allows for a partial ordering of unrelated writes and network packets, but it guarantees that no packet is released until any write it is causally related to has been preserved (backed-up) by the backup site 115.

For example, in the multi-writer system 900 of FIG. 9, the primary processing site 105 includes an example database tier 905 and an example web tier 910 that are both writer tiers that issue writes that are persisted to the secondary processing site 115 (denoted as steps 3 and 4, respectively, in FIG. 9). The web tier 910 is also an outbound tier that generates a first outbound packet that is dependent on the web tier write, but that is not dependent on the database tier write (denoted as step 5 in FIG. 9). This packet is buffered and initially is prevented from being released. A causal chain of communication emanates all the way from the database tier 905 to a second outbound buffered packet (denoted as steps 6 to 8 in FIG. 9). In the illustrated example, acknowledgement of write commits arrive out of order from the secondary processing site 115, with the web tier write arriving first (denoted as step 9 in FIG. 9), thereby allowing the first outbound packet dependent on the web write (but not on the database write) to be released by the primary processing site 105 (denoted as step 10 in FIG. 9). Finally, when the database write is acknowledged by the secondary site 115 (denoted as step 11 in FIG. 9), the second packet, which was buffered in step 8, is permitted to be released to the client by the primary processing site 105 (denoted as step 12 in FIG. 9).

Some example pipelined data replication implementations include one or more of the following disaster recovery features. For example, in some pipelined data replication examples, a disaster is detected via a keep-alive mechanism in which the primary processing site is to periodically respond to a ping message.

Additionally or alternatively, in some pipelined data replication examples, a reverse keep-alive is employed to detect failure of the secondary site, or a network partition, and to thereby trigger a fallback to asynchronous replication in the event of failure of the secondary site, or the network partition. Without such a remedial measure, externally-visible application response could be stalled waiting for replies.

Additionally or alternatively, in some pipelined data replication examples, only the application state recorded to disk at the primary site is protected. Such examples assume that the applications themselves can be restored from disk in the case of disruption and, thus, do not attempt to protect the memory state of applications, which can add a significant overhead in network (e.g., WAN) communications.

Additionally or alternatively, in some pipelined data replication examples, the backup system uses existing VM automation techniques to rapidly instantiate compute resources and recover application state. Enabling seamless network redirection to the secondary site can be achieved using network virtualization mechanisms, such as NAT, MobileIP, or MPLS VPNs. Because pipelined data replication is crash-consistent, disk checking utilities like fsck or self-consistent file systems like ZFS can be used.

Figure 10:
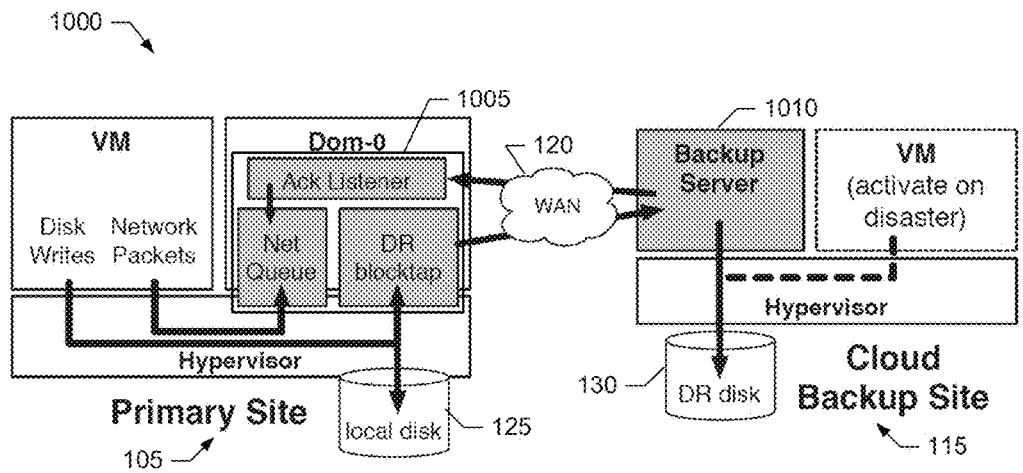
FIG. 10 is a block diagram of a fifth example system supporting pipelined data replication for disaster recovery.

FIG. 10 illustrates a block diagram of a fifth example system 1000 supporting pipelined data replication for disaster recovery. The example system 1000 includes the example primary processing environment 105, the example client 110, the example secondary processing environment 115, the example local storage 125 and the example remote storage 130 of FIG. 1. Accordingly, the detailed descriptions of these elements are provided above in connection with the discussion of FIG. 1 and, in the interest of brevity, are not repeated in the discussion of FIG. 10. The example system 1000 further implements an example replication-aware virtualization system 1005 that is run at the primary site 105 and an example backup server 1010 at the secondary cloud backup site 115. In the illustrated example, pipelined data replication is implemented via modifications to the virtualization platform at the primary site 105, but only needs to run a simple user space application at the backup site 115. Such an implementation allows pipelined data replication to be used today on commercial clouds which do not permit users to have control over the low level platform.

At the primary site 105, pipelined data replication is based on the Xen™ Virtual Machine Monitor (VMM) version 4.0.0. VMs in Xen perform input/output (IO) operations using a split driver architecture with components in a guest operating system (OS) and in dom0, which is a privileged domain that runs hardware drivers and a control stack. Frontend drivers in the OS of the VMs issue requests through shared memory and virtual interrupt lines to backend drivers. The backend drivers in dom0 unpack the requests and re-issue them against the hardware drivers. In the illustrated example of FIG. 10, pipelined data replication is implemented in the system 1000 using hooks at the level of virtual backend drivers, corresponding to NetQueue and DR Blocktap in FIG. 10. Although pipelined data replication is based on Xen in the example of FIG. 10, other VMMs, such as kvm or VMware® ESX, could alternatively be used.

In keeping with the goal of a black-box approach, pipelined data replication as implemented in the system 1000 does not involve source code changes within protected VMs. However, pipelined data replication benefits from information regarding application deployment, and the pipelined data replication implementation resulting from such a configuration is referred to as a gray box implementation. Such a pipelined data replication implementation utilizes a specification of the topology of the multi-tier application being persisted, which may specify, for example, which VMs make up the system (e.g., identified by their Internet protocol (IP) or medium access control (MAC) addresses), which VMs (or virtual disks) need to be persisted (e.g., such as the data disk(s) of the database VM(s)), which nodes are allowed to perform outbound communications (e.g., the load-balancer gateway, or the Apache pool, etc.), etc. In some examples, the VMs for which storage needs to be persisted will be backed by two sets of virtual disks, namely, one storing critical application data, such as a database bit store, and the other backing temporary files and other miscellaneous non-critical data. Given the black box nature of pipelined data replication, this setup alleviates replication overhead (and noise) by differentiating critical disk writes which must be preserved to the backup site. In some example, the configuration information used to implement pipelined data replication in the system 1000 is deployment-specific, and provided by the system administrator who configured the installation (e.g., as opposed to a developer modifying the code).

In the following paragraphs, example implementation details for writer nodes, intermediate nodes and outbound nodes in the primary processing environment 105 of the system 1000 are discussed. Additionally, example implementation details for the secondary backup site 115 are also provided.

To track disk writes in the write node(s) of the primary processing environment 105 and replicate them to the backup site 115, pipelined data replication in the system 1000 uses a custom virtual disk driver backend, which is referred to as DR Blocktap in the example of FIG. 10. In the illustrated example, DR Blocktap is a user-space dom0 daemon utilizing the blocktap Xen infrastructure. As a VM performs reads or writes to its protected disk, the requests are passed to the DR Blocktap disk driver. Read requests are processed as usual.

Writes, however, are demultiplexed by the DR Blocktap disk driver and are issued both to the local storage 125 and sent through a socket to the remote site 115. After issuing each write, the local logical clock of pending writes related to each VM, maintained as a kernel data structure in dom0, is increased. Local writes are then performed with caching disabled, so requests do not return until DMA by the local hardware driver has succeeded. At this point, DR Blocktap indicates to the VM that the write has completed, regardless of the status of the write traveling to the secondary site 115.

It is noted that typical OS behavior (Windows or UNIX) consists of issuing multiple writes simultaneously to leverage scatter-gather DMA capabilities. There are no expectations about ordering of writes in hardware, and a successful response is propagated upstream only after all writes in the batch have succeeded. In the absence of disk synchronization barriers (a hardware primitive that is not yet supported in Xen virtual drivers), the OS achieves synchronous-like behavior by waiting for the batch to finish. Accordingly, the DR Blocktap disk driver tags each individual write in a batch with its own value, which enables write ordering to be respected when processing backup acknowledgements, thereby maintaining the expected synchronous semantics.

At the intermediate nodes of the primary processing environment 105, to track causality as it spreads throughout the multi-tier system 1000, information about disk writes is propagated between tiers by being included in the communications among tiers. This is achieved in the example system 1000 by injecting the value of the local logical counter (clock) into packet headers of inter-VM communication, for example, through the addition of an IP header option in IP packets.

Virtual networking in Xen can be achieved by creating a network interface in dom0. This interface injects, in the dom0 network stack, replicas of the Ethernet frames emanating from the VM. The interface replicates a frame by first copying, to the dom0 address space, the Ethernet, IP and transmission control protocol (TCP) headers. By copying these bytes, dom0 can now modify headers (e.g., to realize network address translation (NAT) or similar functionality). The remainder of the packet is constructed by mapping the relevant VM memory pages to be read-only.

In some examples, the copying of the header bytes is performed at the point of insertion of an IP header option. The option is constructed by relying on an unused IP header option ID number (e.g., 0xb). The IP header option payload simply contains the logical counter value, and then the remaining header bytes are copied. No extra copying, mapping, or reallocation overhead is introduced when expanding packets in this way. In some examples, the length fields in the IP header are modified, and checksums are recalculated. In some examples, the VM OS offloads checksum calculations to hardware or a backend virtual driver. Therefore, additional overhead is not incurred in the data path by computing checksums at this point.

In some examples, not all packets are tagged with the logical counter. For example, non-IP packets can be ignored because, in practice, non-IP packets (e.g., ARP, STP, etc.) do not represent application-visible messages. In some examples, packets that already contain an IP header option are not tagged. This may be done to diminish implementation complexity, but is not an inflexible constraint. In practice, packets containing an IP header option are infrequent. Optionally, empty TCP segments may not be tagged. These typically refer to empty TCP acknowledgments (ACKS), which do not affect causality because they do not represent application-visible events. Additionally, most application protocols include their own application-level ACKs (e.g. HTTP 200). In some examples, empty TCP segments with the SYN, FIN, or RST flags, which do result in application visible events, are tagged.

In some examples, the space overhead for pipelined data replication is 20 bytes per packet, with 16 bytes dedicated to the logical clock in the IP header option. In the case of vector clocks for multi-writer systems, this limits the size of the vector to four 32-bit entries. This is not an inflexible limit, although accommodating hundreds of entries may result in little useful payload per packet, and a noticeable bandwidth overhead.

Outbound nodes in the primary processing environment 105 of the system 1000 maintain two local logical clocks. The clock of pending writes is updated by either (or both of) the issuing disk writes or propagation of causality through internal network packets. The second clock of committed writes is updated by acknowledgments from the DR backup site 115. Comparing the two clocks allows the outbound node(s) of the system 1000 to determine if a network packet produced by the VM can be released or if it must be temporarily buffered.

The foregoing is achieved by appending a queuing discipline to the network backend driver (referred to as Net-Queue in FIG. 10), which tags outbound packets with the current pending write counter (clock) maintained by the outgoing node(s). Because the logical counters (clocks) increase monotonically, packets can be added at the back of the queue and taken from the front without the need for sorting. Packets are de-queued and released by the outbound node(s) of the primary processing environment 105 as updates to the committed logical clock are received.

No assumptions are made on the behavior of disk IO at the secondary site 115. As such, write completion may be acknowledged out of order, which is relevant given the previous discussion on synchronous-like behavior. Out-of-sequence acknowledgements are thus not acted upon until all intermediate acknowledgements arrive.

In some examples, for vector clocks with two or more entries, the outgoing node(s) of the primary processing environment 105 in the system 1000 use a set of cascading queues, one for each entry in the vector. As different entries in the committed vector clock are updated, the affected packets at the front of the corresponding queue are de-queued and inserted in the next queue in which they have to block. In some examples, insertion uses binary search to maintain queue ordering. Once popped from the last queue, packets are permitted to be released and leave the primary processing environment 105 of the system 1000.

At the secondary site 115, an example backup server 1010 collects all incoming disk writes, commits them to the storage volume 130, which can be used as the disk of a recovery VM if there is a disaster, and acknowledges write commits to the primary site 105. In some examples, the backup server 1010 is a user level process and, thus, does not require any special privileges on the backup site 115. For example, pipelined data replication can be deployed using the Amazon® Elastic Compute Cloud and Elastic Block Store services.

When there is only a single disk to be protected, the backup server 1010 of the illustrated example performs writes directly to the backup storage volume 130. These writes may be performed in a durable manner, which flushes them past the OS level cache. For the multi-writer case, a single backup server 1010 receives write streams from multiple protected VMs. Unlike the single disk case, this means that writes from multiple disks are to be preserved respecting total ordering, if possible. Without special handling, the WAN link, the kernel and the disk controller at the backup server 1010 may all reorder writes. If a failure occurred, this could result in a write being preserved without causally-precedent writes having survived.

To avoid this problem, the vector clocks maintained at each primary server (node/tier) in the primary processing environment 105 are used as a guide for how writes to the backup disks at the backup site 115 should be ordered. When a primary server sends a disk write to the backup site 115, it includes its current vector clock. Ordering of the vector clocks indicates causality precedence and allows the backup server 1010 to enforce the same ordering in its writes. Writes which are considered to have concurrent vector clocks are permitted to have any ordering.

In some examples, the backup server 1010 maintains dedicated hardware (an SSD or a separate log-structured rotating disk) to initially record the writes it receives, with metadata about each write pre-pending the data. Writes are thus persisted, and acknowledgements returned to the primary site 105, with minimal latency. A separate consumer process then opportunistically transfers the writes to the actual VM disk volumes. The vector clock-based ordering of writes among tiers is performed at this later stage, outside of the critical acknowledgement path.

Returning to the consideration of RPO, guaranteeing that clients using pipelined data replication will experience the same recovery semantics upon disaster as with synchronous replication is closely tied to the ability to introspect causality relations on a black-box VM. In a single-VM system, the local machine clock can be used as a global clock to timestamp writes and network packets and derive a total ordering of events. In this case, holding a packet until all writes with timestamps lower or equal to the packet is sufficient to ensure all causally dependent writes have finished. Next consider the multi-VM single-writer scenario.

LEMMA 1: In a multi-VM single writer system, it is sufficient to hold a network packet until the commit count at the secondary site becomes greater than or equal to the local counter value at the outbound node of the primary site.

Proof Sketch: At the writer node, tagging internal messages with the local write counter captures all writes that were issued prior to sending out this internal message (and thus, all causally dependent writes as well). As shown in FIG. 8, each node computes the maximum of its local counter and the count value in the arriving message. Because the counters at other nodes lag the writer node, this operation propagates the counter value from the writer node to the other node. At the outbound node, holding the network packet until writes committed by the secondary site exceed this counter ensures that all causally dependent writes issued by the writer node have been completed at the secondary site.

The example pipelined data replication implementation of FIG. 10 uses three additional mechanisms to ensure that this property holds in practice even in multi-core environments: (i) the Xen backend driver executes in a serialized manner for a given virtual device; (ii) VMs are limited to a single network interface and a single protected block device; and (iii) the clock is updated with atomic barrier instructions.

Next, consider the general multi-VM multi-writer case. Here count vectors are used to track a write frontier of causally dependent writes at each writer. Like in the single writer case, the dependencies are propagated by piggybacking count vectors on internal messages. Upon message receipt, a node computes the maximum of the local and piggybacked count vector, thereby capturing the union of all causally dependent writes that need to be tracked. Thus, the following applies:

LEMMA 2: In a multi-writer system, it is sufficient for pipelined data replication to release a network packet once all writes with a count vector less than or equal to that of the network packet have finished.

Proof Sketch: The count vector, m, which an outgoing message is tagged represents the events at each writer node that happened before the packet was created. If $m[i]=k$, then all writes up to k at writer node i must have causally preceded packet m. Likewise, any write with value greater than k at node i is considered to have happened concurrently (or after) packet m. Hence, holding the packet until all writes in m have finished on all machines ensures that all causally related writes complete before network output becomes visible.

Armed with these conclusions, the client RPO guarantees described above in the context of FIG. 5 can be revisited for the case of pipelined data replication. First, in pipelined data replication, the secondary view (SV) remains a subset of the primary view (PV) because writes are propagated to the secondary site after issuance in the primary site. Second, in pipelined data replication, the Client View (CV) remains a subset of the SV because the CV is only updated when client-bound packets are released. Thus, pipelined data replication, like synchronous replication, yields a client RPO of zero. Per lemma 2, clients will not receive updates that are not contained in the secondary site and, therefore, no inconsistencies will arise after disaster recovery.

Figure 11:
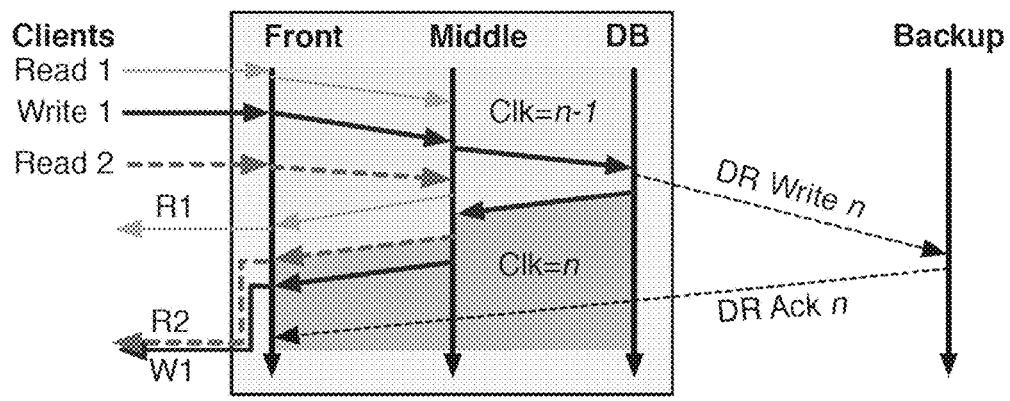
FIG. 11 illustrates further example pipelined data replication operations capable of being performed by the example systems of FIGS. 1, 7-9 and/or 10.

One potential issue with black-box causality tracking for pipelined data replication is that this approach conservatively marks all writes issued before an outgoing message as dependent. However, while this set of writes contains all causally dependent writes, it may include other independent writes as well. Because a black-box system has no application visibility, it is unable to discern between dependent and independent writes and, thus, all prior writes are conservatively marked as dependent for safety. For example, consider two separate application threads processing requests on different data items. A black-box implementation of pipelined data replication may not be able to differentiate between these threads and, as a result, may conservatively mark the network packets from one thread as being dependent on the writes from the other thread which happened to precede them, regardless of actual application level dependence. Such behavior is illustrated in the example of FIG. 11. In FIG. 11, while both reads are independent from "Write 1," "Read 2" is affected by communication between the middle and database tiers after "Write 1" is propagated to the secondary site. As a result, although the reply to "Read 1" can be released immediately, the reply to "Read 2" is delayed.

While example manners of implementing pipelined data replication for disaster recovery in the example systems 100, 700, 800, 900 and 1000 have been illustrated in FIGS. 1-11, one or more of the elements, processes and/or devices illustrated in FIGS. 1-11 may be combined, divided, rearranged, omitted, eliminated and/or implemented in any other way. Further, the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005, the example backup server 1010 and/or, more generally, the example systems 100, 700, 800, 900 and/or 1000 may be implemented by hardware, software, firmware and/or any combination of hardware, software and/or firmware. Thus, for example, any of the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005, the example backup server 1010 and/or, more generally, the example systems 100, 700, 800, 900 and/or 1000 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example systems 100, 700, 800, 900 and/or 1000, the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005 and/or the example backup server 1010 are hereby expressly defined to include a tangible computer readable medium such as a memory, digital versatile disk (DVD), compact disk (CD), Blu-ray Disc™, etc., storing such software and/or firmware. Further still, the example systems 100, 700, 800, 900 and/or 1000 may include one or more elements, processes and/or devices in addition to, or instead of, those illustrated in FIGS. 1-11, and/or may include more than one of any or all of the illustrated elements, processes and devices.

Figure 12:
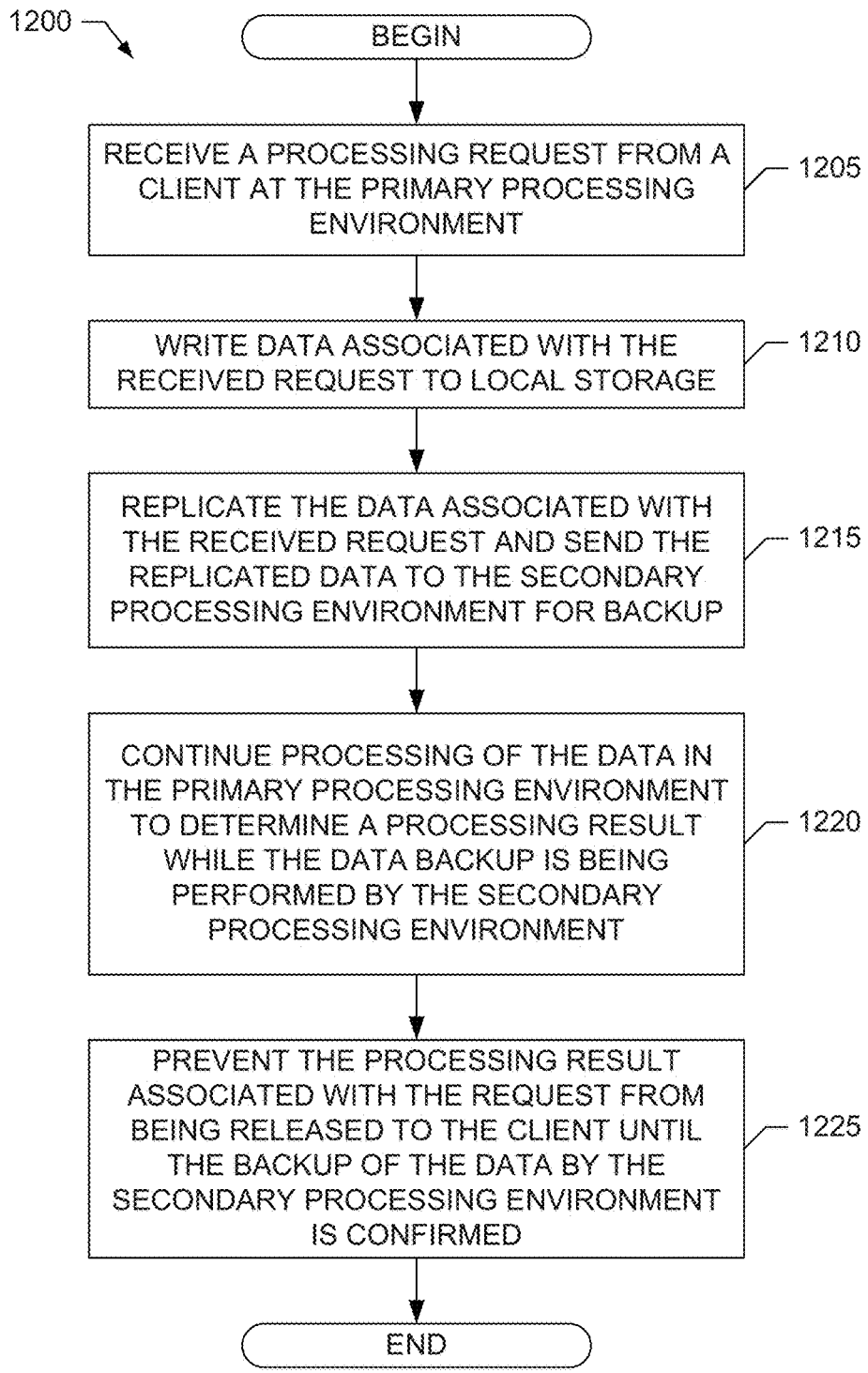
FIG. 12 is a flowchart representative of first example machine readable instructions that may be executed to implement pipelined data replication for disaster recovery in the example systems of FIGS. 1, 7-9 and/or 10.
Figure 13A:
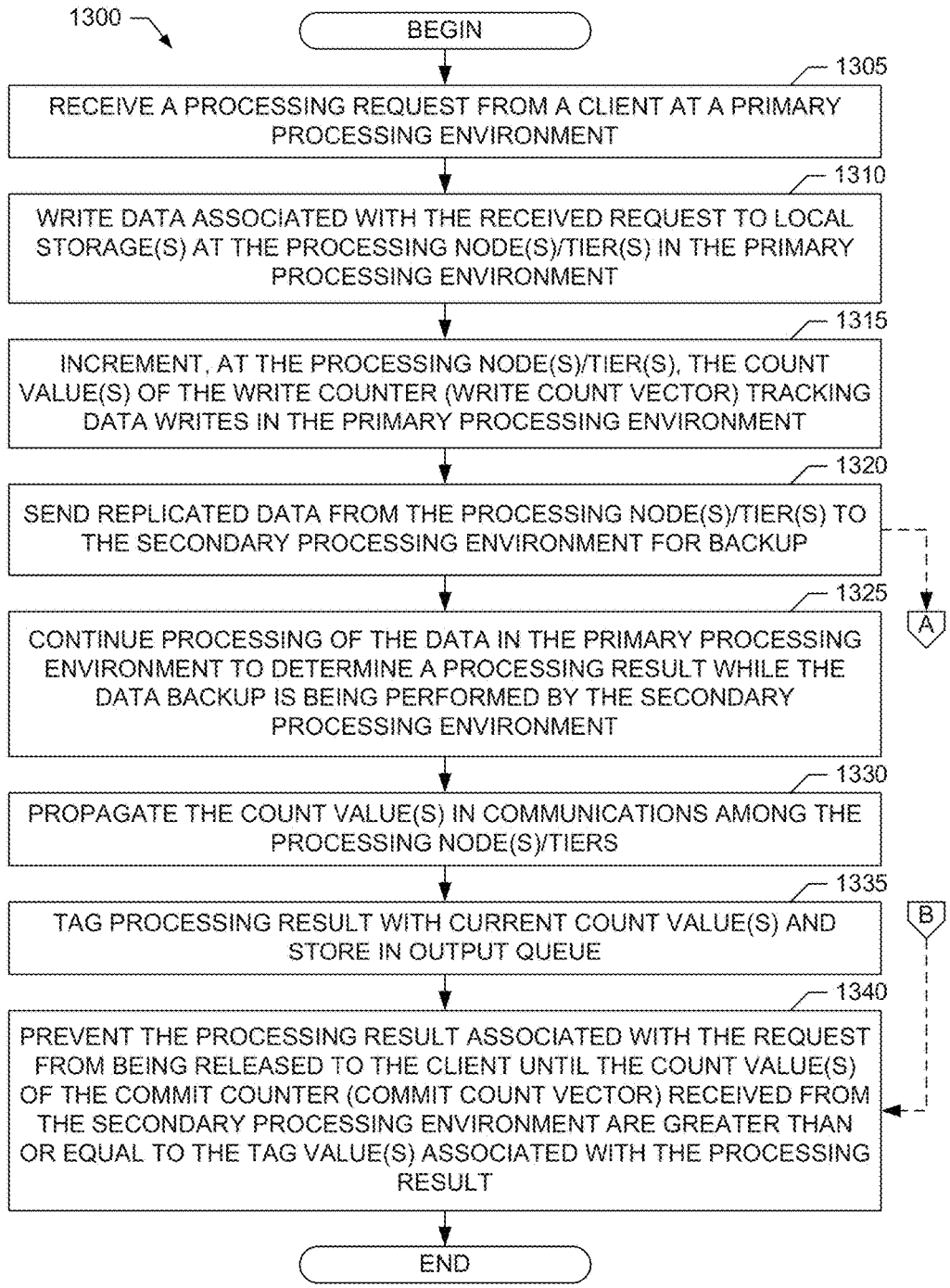
FIGS. 13A-B collectively form a flowchart representative of second example machine readable instructions that may be executed to implement pipelined data replication for disaster recovery in the example systems of FIGS. 1, 7-9 and/or 10.
Figure 13B:
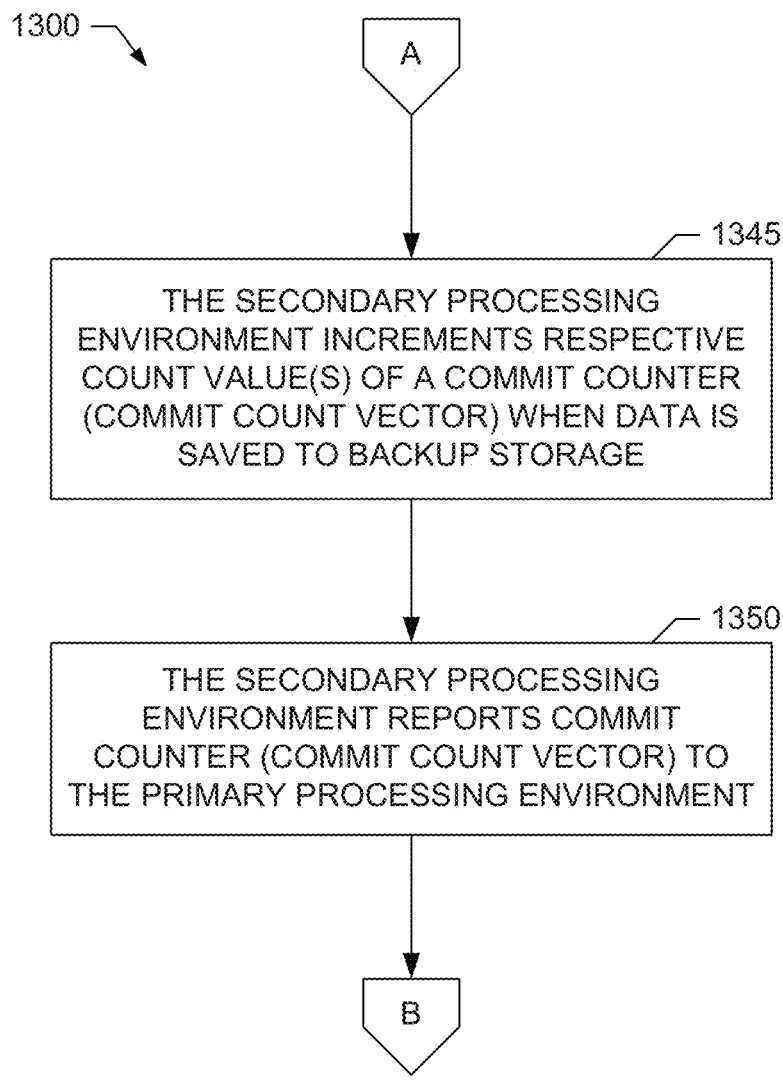

Flowcharts representative of example machine readable instructions for implementing the example systems 100, 700, 800, 900 and/or 1000, the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005 and/or the example backup server 1010 are shown in FIGS. 12 and 13A-B. In these examples, the machine-readable instructions represented by each flowchart may comprise one or more programs for execution by a processor, such as the processor 2212 shown in the example processing system 2200 discussed below in connection with FIG. 22. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 2212, but the entire program or programs and/or portions thereof could alternatively be executed by a device other than the processor 2212 (e.g., such as a controller and/or any other suitable device) and/or embodied in firmware or dedicated hardware (e.g., implemented by an ASIC, a PLD, an FPLD, discrete logic, etc.). Also, one or more of the machine-readable instructions represented by the flowchart of FIGS. 12 and 13A-B may be implemented manually. Further, although the example machine readable instructions are described with reference to the flowcharts illustrated in FIGS. 12 and 13A-B, many other methods of implementing the example systems 100, 700, 800, 900 and/or 1000, the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005 and/or the example backup server 1010 may alternatively be used. For example, with reference to the flowcharts illustrated in FIGS. 12 and 13A-B, the order of execution of the blocks may be changed, and/or some of the blocks described may be changed, eliminated, combined and/or subdivided into multiple blocks.

As mentioned above, the example processes of FIGS. 12 and 13A-B may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 12 and 13A-B may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

First example machine-readable instructions 1200 that may be executed to implement pipelined data replication for data recovery in one or more of the example systems 100, 700, 800, 900 and/or 1000 are illustrated in FIG. 12. For convenience, and without loss of generality, execution of the example machine-readable instructions 1200 is described in the context of execution in the example system 100 of FIG. 1. With reference to the preceding figures and associated descriptions, the machine-readable instructions 1200 of FIG. 12 begin execution at block 1205 at which the primary processing environment 105 of the example system 100 receives a processing request from the client 110. At block 1210, the primary processing environment 105 writes data associated with the received request to the local storage 125.

At block 1215, the primary processing environment 105 replicates the data written to the local storage 125 at block 1210 and that is associated with client request. At block 1215, the primary processing environment 105 also sends the replicated data, via the network 120, to the secondary processing environment 115 of the system 100. At block 1220, the primary processing environment 105 continues processing of the data associated with the received request (e.g., to determine a processing result) while the replicated data is being backed up by the secondary processing environment 115 (thereby pipelining/overlapping data replication with data processing, as described above). At block 1225, the primary processing environment 105 prevents a reply containing the processing result associated with the received request from being released to the client 110 until the backup of the replicated data by the secondary processing environment 115 is confirmed, as described above (thereby ensuring a zero RPO, as described above).

Second example machine readable instructions 1300 that may be executed to implement pipelined data replication for data recovery in one or more of the example systems 100, 700, 800, 900 and/or 1000 are illustrated in FIGS. 13A-B. For convenience, and without loss of generality, execution of the example machine-readable instructions 1300 is described in the context of execution in the example systems 800 of FIG. 8. With reference to the preceding figures and associated descriptions, the machine-readable instructions 1300 begin execution at block 1305 of FIG. 13A at which the primary processing environment 105 of the example system 800 receives a processing request from the client 110. At block 1310, the writer tier 805 of the primary processing environment 105 writes data associated with the received request to the local storage 125. At block 1315, the writer tier 805 increments its write counter WCnt (or, in the system 900, its particular element of the count vector) to track the data writes performed by the writer tier 805 in the primary processing environment 105. At block 1320, the writer tier 805 replicates the data being stored in the local storage 125 (and which is associated with the received request) and sends the replicated data, via the network 120, to the secondary processing environment 115 of the example system 800 for backup.

At block 1325, processing of the data associated with the received request continues in the primary processing environment 105 while the replicated data is being backed up by the secondary processing environment 115 (thereby pipelining/overlapping data replication with data processing, as described above). At block 1330, the write count values are propagated among the tiers 805-815 by being included in data communications exchanged between the tiers 805-815. At block 1335, the outbound tier 815 of the primary processing environment 105 prepares a reply data packet to send to the client 110, which contains the result of processing the data associated with the request previously received from the client 110. At block 1335, the outbound tier 815 also tags the reply data packet with a tag value based on (e.g., equal to) the write count value maintained by the outbound tier 815 (and which represents the data writes on which the reply data packet may depend, as described above). At block 1340, the outbound tier 815 of the primary processing environment 105 prevents the reply data packet containing the processing result associated with the received request from being released to the client 110 until the committed count CommitCnt (or, in the system 900, the elements of the committed count vector) received from the secondary processing environment 115 is greater than the tag value (or the respective tag value elements in the system 900) associated with the reply data packet. As described above, by waiting until the committed write count value (vector) is greater than or equal to the tag value (vector) to release the reply data packet confirms that data writes on which the processing result in the reply may depend have been backed up by the secondary processing environment 115 (thereby ensuring a zero RPO, as described above).

In parallel with the processing performed by the primary processing environment 105 at block 1325-1335, the secondary processing environment 115 performs the processing at block 1345 and 1350 of FIG. 13B. At block 1345 of FIG. 13B, the secondary processing environment 115 increments its committed counter CommitCnt (or, in the system 900, the appropriate element of the committed count vector corresponding to the processing tier/node whose data is being backed up) when the replicated data received from the writer tier 805 of the primary processing environment 105 has been saved to the backup storage 130. At block 1350, the secondary processing environment 115 reports its committed counter CommitCnt (or the committed count vector in the context of the system 900) to the outbound tier 815 of the primary processing environment 105, as described above.

Performance results for an example implementation of pipelined data replication for disaster recovery are now discussed. The performance of pipelined data replication under normal operating conditions, as well as its failure properties, were evaluated using both a local testbed and resources from Amazon® EC2. The local testbed used a set of Dell® servers with quad core Intel® Xeon 2.12 GHz CPUs and 4 GB of RAM. The servers were connected by a LAN, but used the Linux tc tool to emulate network latency between the hosts, which provides a reliable WAN network emulation of 50 or 100 ms delays. The EC2 experiments use Large virtual machine instances (having two 64-bit cores and 7.5 GB of memory) in the US East region. Virtual machines in both the local testbed and EC2 use CentOS 5.1, Tomcat 5.5, MySQL 5.0.45, and Apache 2.23. The replication tools are compared in the following results: DRBD 8.3.8 in synchronous mode, pipelined data replication as disclosed herein, and an asynchronous replication tool based on pipelined data replication but without any network buffering.

The performance evaluation focuses on client-server applications and, in particular, the following three test applications. First, the MySQL database is used either by itself or as part of a larger web application. In this application, the InnoDB storage engine is used to ensure that database writes are committed to disk before replying to clients, and all of the InnoDB data and log files are stored on a protected disk partition. In single VM experiments, communication is directly with the MySQL database via a Java application running on an external client machine. The second application involves TPC-W, which is an e-commerce web benchmark that emulates an online bookstore. TPC-W is composed of two tiers, a Tomcat application server and a MySQL database, that each run in separate virtual machines. In the performance evaluations, only the disk used for the database files is protected. TPC-W includes a client workload generator which runs on a server that is considered external to the protected system. The third application involves a PHP based web application, called CompDB, which allows precise control of the amount of computation and database queries performed when processing requests. The third application can be deployed across one, two, or three tiers, each of which runs an Apache server and a MySQL database. Requests are generated by the httperf tool and access a PHP script on the front-end server which performs a configurable amount of computation and insert queries to the local database before being propagated to the next tier, which repeats the process. Together, these applications allow emulation of realistic application workloads and controlled analyses of different workload factors.

Example performance results for pipelined data replication when protecting the disk of a MySQL database are now examined. In the following examples, a 50 ms RTT was imposed from primary site to backup site in the local testbed, which limits the minimum possible response time to 50 ms for the non-asynchronous approaches.

Figure 14A:
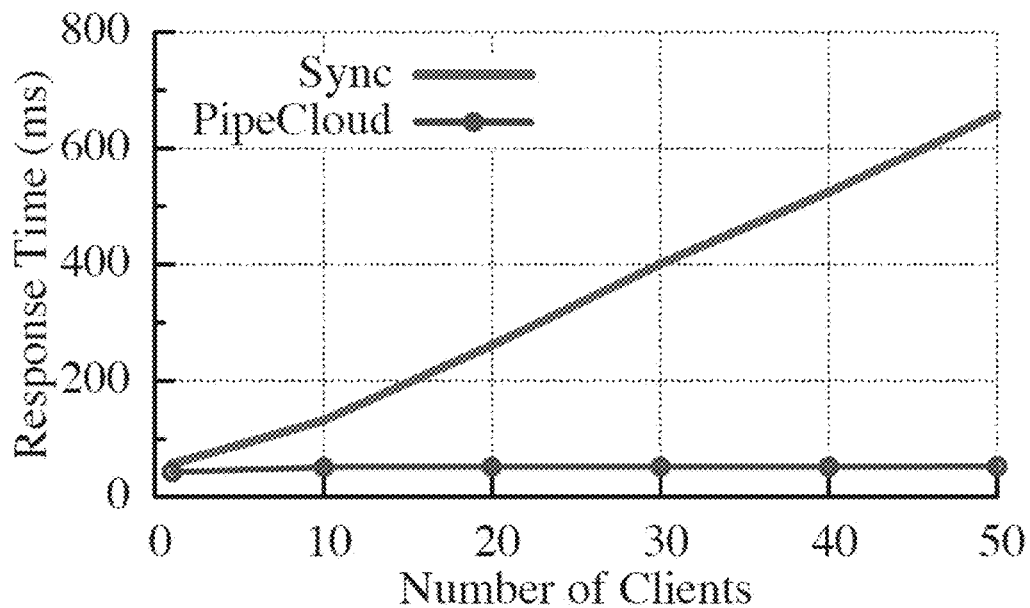
FIGS. 14A-21 illustrate example performance results associated with pipelined data replication for disaster recovery as disclosed herein.

FIG. 14A shows how the response time changes as the client load on the database increases. In the illustrated example, each client connects to the database server and repeatedly inserts small 8-byte records into a table. Because the protected application is a database that must ensure consistency, the table must be locked for each individual transaction so they can be performed serially. With synchronous data replication, the table must be locked for at least one RTT because a transaction cannot complete until the remote disk acknowledges the write being finished. This means that when a client request arrives, it must wait for a round trip delay for each pending request that arrived before it. This causes the response time, when using synchronous data replication, to increase linearly with a slope based on the round trip delay to the backup.

Figure 14B:
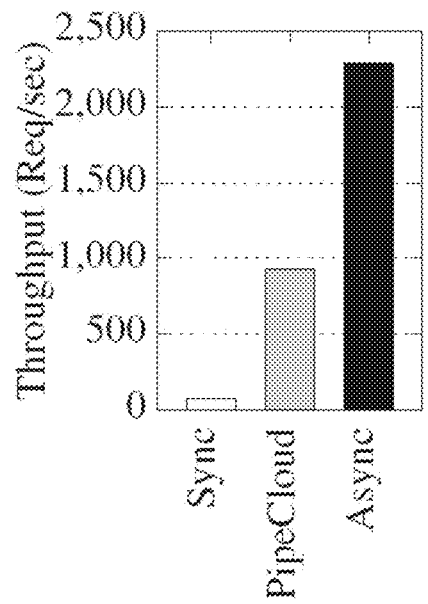

In contrast, for pipelined data replication, the database table only needs to be locked until the local disk write completes, allowing for much faster request processing. This results in a much lower response time and higher throughput because many requests can be processed during each round trip delay to the backup. FIG. 14B shows that pipelined data replication achieves a maximum throughput over twelve times higher than synchronous data replication. While using an asynchronous approach may allow for an even higher throughput, pipelined data replication provides what asynchronous approaches cannot, zero data loss.

Figure 15A:
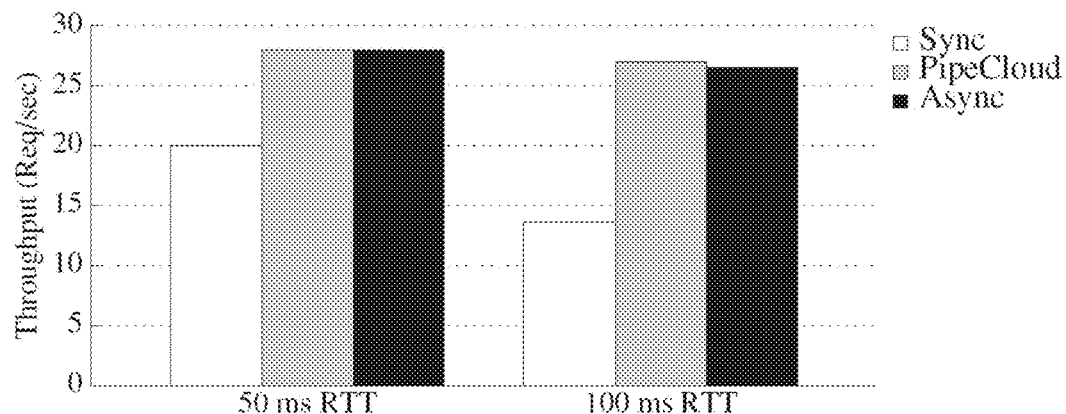

Next, using pipelined data replication to protect a set of virtual machines running the TPC-W online store web benchmark is analyzed to investigate the performance of an application with a mixed read/write workload. The overall performance of TPC-W is measured for different replication mechanisms as the latency between the primary site and backup site is varied. FIG. 15A shows the maximum throughput achieved by the different replication schemes.

The maximum throughput of pipelined data replication is nearly identical to that of an asynchronous scheme because the ability to pipeline request processing and state replication effectively masks the overhead of disaster recovery. When the round trip delay increases to 100 ms, the throughput of synchronous data replication drops even further, but pipelined data replication performance is effectively unaffected, resulting in pipelined data replication being able to maintain a throughput nearly two times better than the synchronous approach.

Figure 15B:
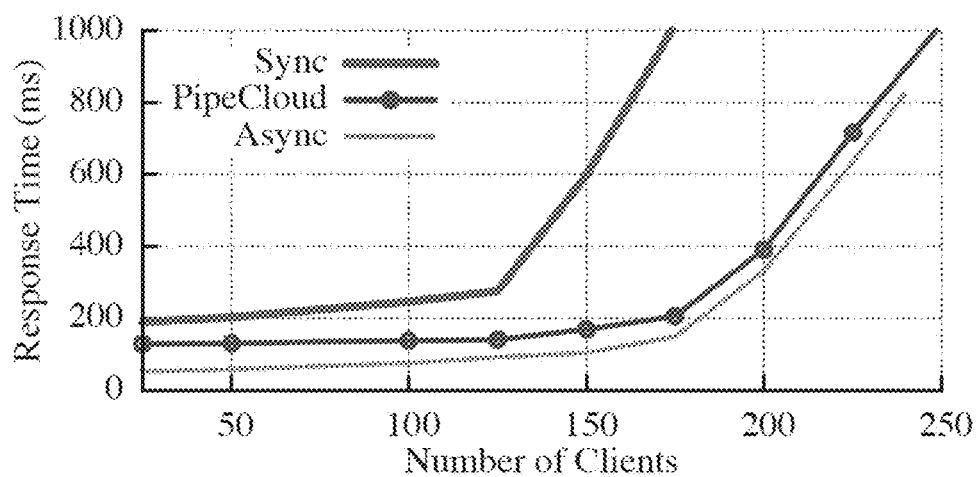

In FIG. 15B, the pipelining aspect of pipelined data replication is seen to also reduce response times compared to a synchronous approach, even for relatively low client loads where the throughput of each approach is similar. The load-response time curve for pipelined data replication closely follows the asynchronous approach, offering a substantial performance benefit compared to synchronous and the same level of consistency guarantees.

Figure 16A:
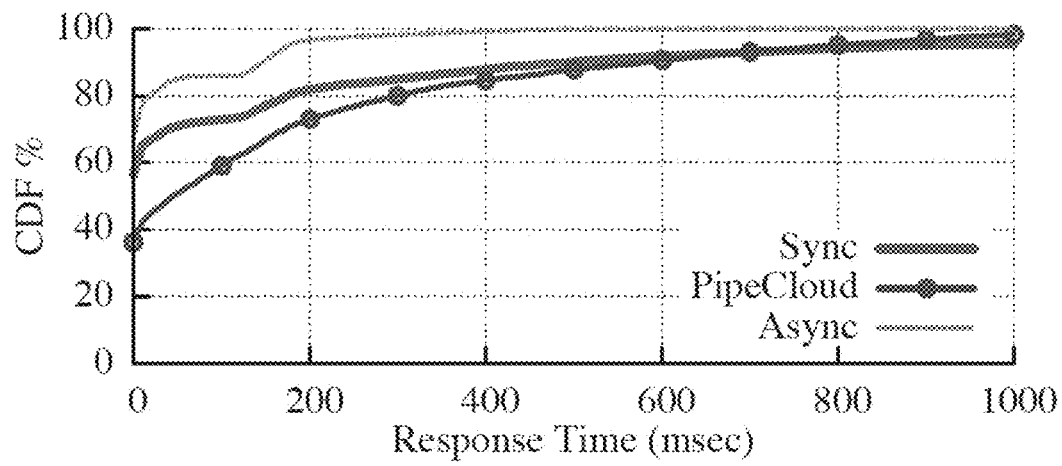

Next, the request types of the TPC-W application are categorized into those which involve writes to the database and those which are read-only. The workload contains a mix of 60% reads and 40% writes, and the response times for each category are measured. FIG. 16A shows a cumulative distribution function (CDF) of the response times for read-only requests when there are 50 active clients and there is a 100 ms roundtrip time to the backup. Pipelined data replication has a slightly higher base response time because some read-only requests are processed concurrently with requests which involve writes. Because the pipelined data replication implementation of the illustrated example does not distinguish between the packets related to read-only or write requests, it conservatively buffers both types. However, even with some requests being unnecessarily delayed, the overall performance of pipelined data replication for reads is very close to synchronous DRBD (which refers to "Distributed Replicated Block Device" and is described at drbd.org).

Figure 16B:
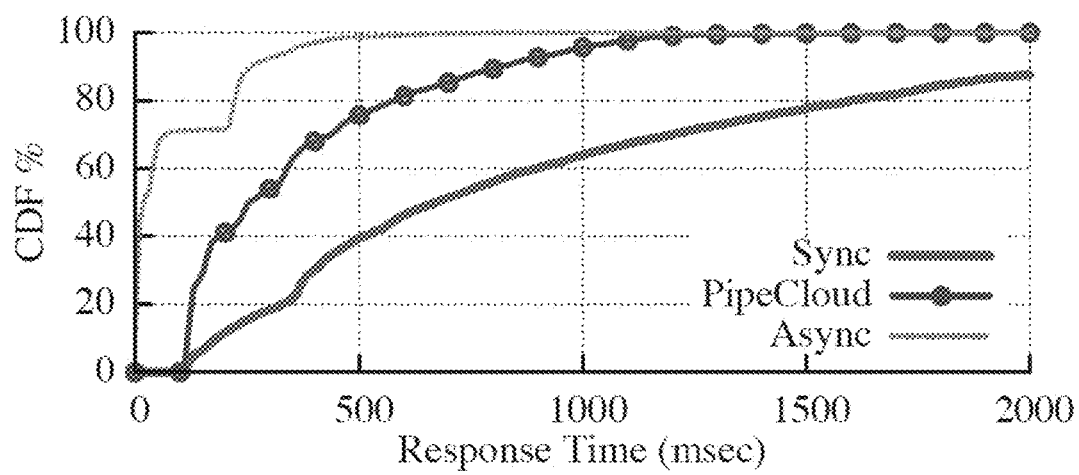

The benefits of pipelined data replication are further demonstrated by observing the response time of requests that involve at least one database write as illustrated in FIG. 16B. The ability of pipelined data replication to overlap processing work with network delays decreases the median response time by 50%, from over 600 ms to less than 300 ms. Only 3% of requests involving pipelined data replication take longer than one second, whereas with synchronous replication that rises to nearly 40%. This improved performance allows pipelined data replication to be used with much more stringent performance service level agreements (SLAs).

Figure 17:
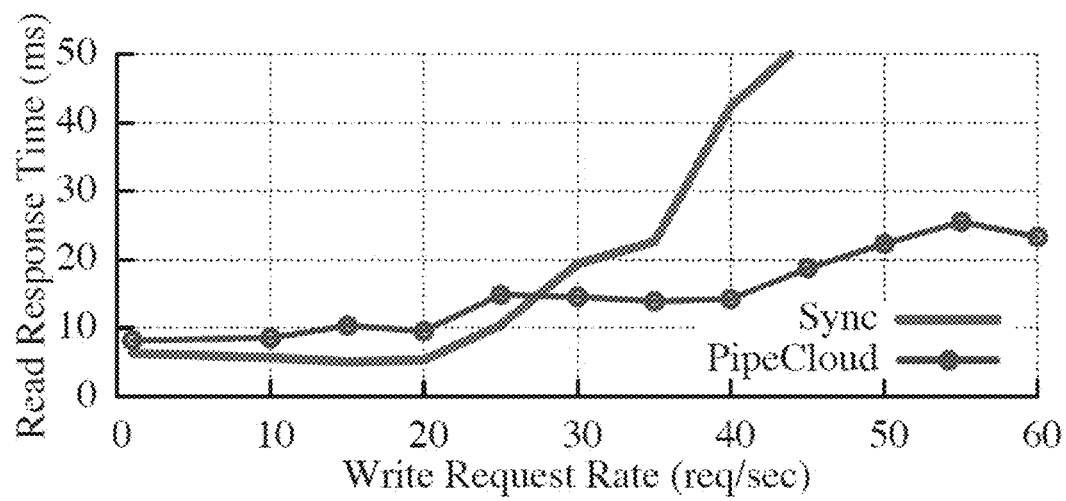

Another experiment explored how the network buffering in pipelined data replication can delay read-only requests that are processed concurrently with writes. The CompDB web application discussed above was used in a single-VM setup and a constant stream of 100 read requests per second was sent, as well as a variable stream of write requests that insert records into a protected database. The read requests returned static data while the writes cause a record to be inserted to the database. There was a 50 ms RTT between primary and backup sites. FIG. 17 shows how the performance of read requests is impacted by the writes. When there is a very low write request rate, the response time of synchronous data replication and pipelined data replication are similar, but as the write rate rises, pipelined data replication sees more read-only packets being delayed. However, the increased write rate also has a performance impact on the read requests in synchronous data replication because the system quickly becomes overloaded. Pipelined data replication is able to support a much higher write workload and still provide responses to read requests within a reasonable time. The trade-off provided by pipelined data replication can be a desirable one for application designers, because a small reduction in read performance at low request rates is balanced by a significant reduction in write response times and support for higher overall throughput.

To verify the ability of pipelined data replication to hide replication latency by overlapping it with useful work, an experiment was performed in which the amount of computation in a multi-tier server was arbitrarily adjusted. The CompDB application discussed above, and split into two tiers, was used, wherein the front tier performed a controlled amount of computation and the backend inserted a record into a database. Pipelined data replication was compared against a naive version that only applies pipelining to the database tier. The RTT for the backup site was 50 ms.

Figure 18:
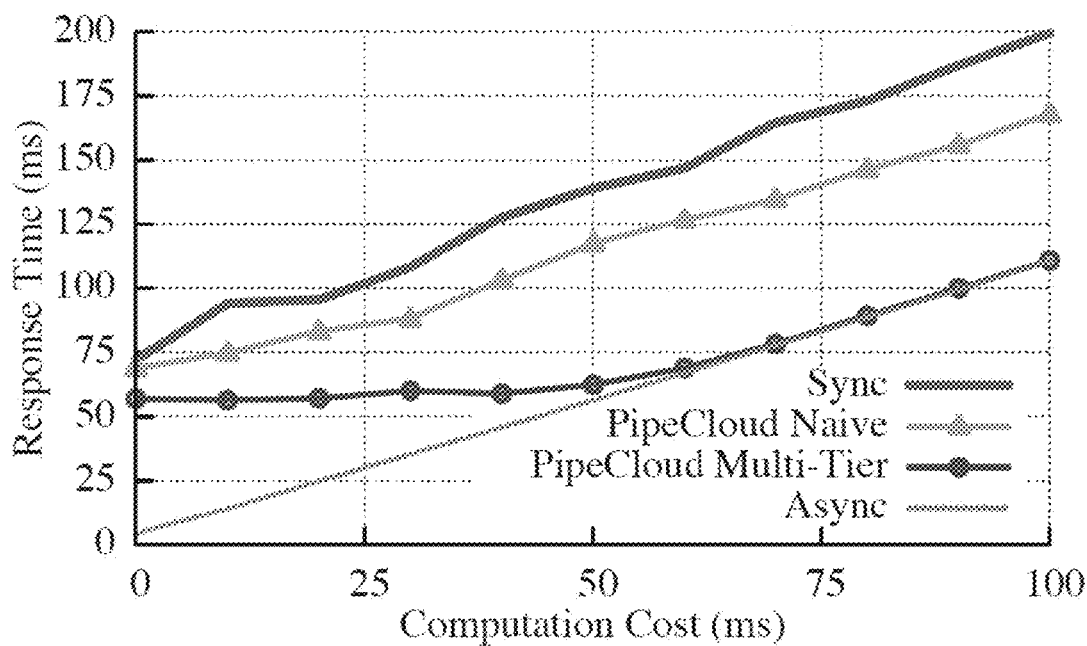

FIG. 18 shows how the average response time changes as a function of the controlled amount of computation. As the computation cost increases, the synchronous and naive pipelined data replication approaches have a linear increase in response time because the front tier must wait for the full round trip before continuing further processing. However, when pipelined data replication is applied across the two tiers, it is able to perform this processing concurrently with replication, essentially providing up to 50 ms of "free"

computation. For requests that require more processing than the round trip time, pipelined data replication provides a similar response time as an asynchronous approach, with the advantage of providing much stricter client RPO guarantees.

Figure 19:
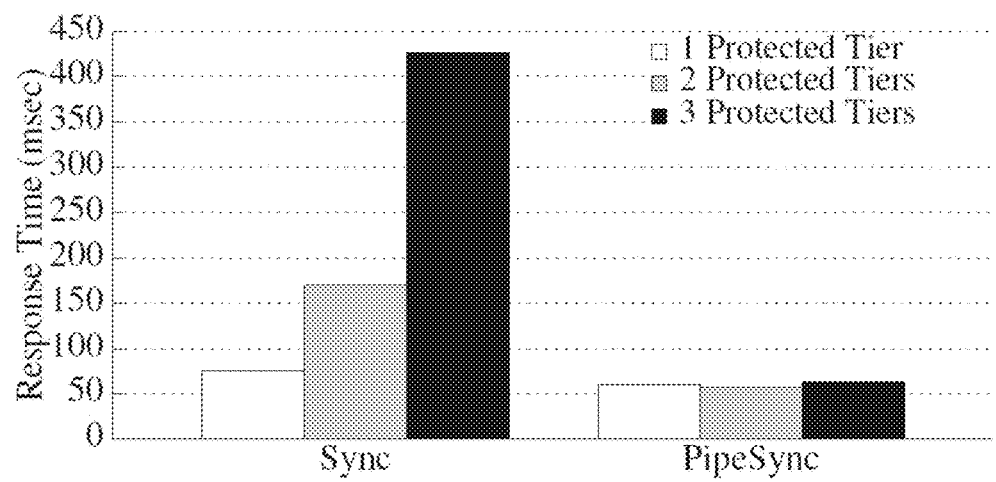

With existing data replication approaches for data recovery, often only a single tier of an application is protected with data recovery because it is too expensive in terms of cost and performance to replicate the state of multiple application tiers. To evaluate the ability of pipelined data replication to support multiple servers with protected storage, a 3-tier deployment of the CompDB application discussed above was configured so each tier includes both a web and database component. FIG. 19 shows the average response time of requests to this application when one, two, or all three of the tiers are protected by a disaster recovery system. In the illustrated example, there is a 50 ms RTT, and a single client is used in order to provide a best-case response time. With synchronous replication, the response time increases by more than a round trip delay for every tier protected because the writes performed at each tier must be replicated and acknowledged serially.

Pipelined data replication, on the other hand, is able to pipeline the replication processes across tiers, providing both better overall performance and only a minimal performance change when protecting additional tiers. When protecting all three tiers, pipelined data replication reduces the response time from 426 ms to only 63 ms, yielding a 6.7 times reduction. Being able to pipeline the replication of multiple application components allows pipelined data replication to offer zero data loss guarantees to applications which previously would have resorted to asynchronous replication approaches simply due to the unacceptable performance cost incurred by serial, synchronous replication.

Figure 20:
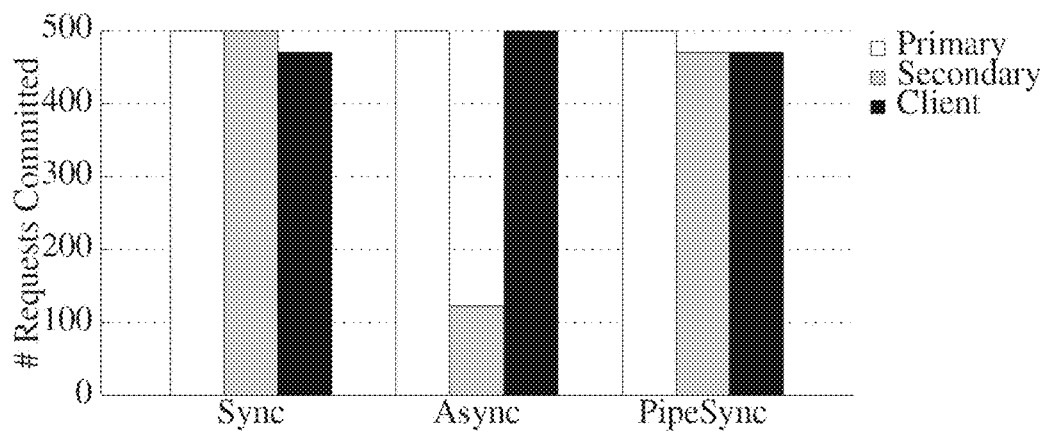

In some examples, pipelined data replication seeks to provide performance on-par with asynchronous data replication, while also seeking to assure clients of the same consistency guarantee as a synchronous approach. FIG. 20 compares the consistency guarantees provided by synchronous data replication, asynchronous data replication, and pipelined data replication. In the illustrated example, a single MySQL database is backed up to a secondary site 50 msecs away. Out of a set of 500 database inserts that occur immediately prior to a disaster, the number of records recorded at the primary and secondary sites and the number of confirmations received by the client is examined. Synchronous data replication guarantees that the secondary view (SV) is almost identical to the primary (PV), but allows the client (CV) to lag behind the secondary. With asynchronous data replication, the client is not limited by the rate of confirmations from the secondary site, causing the client to receive many unsafe replies (CV>SV). However, with pipelined data replication, these unsafe replies do not occur because network packets are buffered until the acknowledgments from the secondary site are received. As a result, pipelined data replication is able to provide clients with the same guarantee as synchronous data replication, namely, that the data for any received response has been safely committed to the backup site.

Next, the results of emulating a disaster scenario in which the secondary site takes over request processing for a CompDB stack, configured with a frontend node that performs database insertions on a master-master database split between two backend nodes, are examined. In this example, the primary site is run within the local testbed and Amazon EC2 VMs are used to run both the backup and the failover servers. The network latency measured from the primary site (which was in western Massachusetts) to the backup server (which was in EC2's northern Virginia site) was 16 ms. EBS volumes were used for the two protected database disks. Prior to the failure, a single EC2 VM acting as the backup server applies the write streams received from both of the protected VMs to the EBS volumes.

Upon failure, the backup server disabled replication and unmounted the EBS volumes. It used the EC2 API to instantiate three new VM instances, and connected the two backup volumes to the newly started VMs. During bootup, the database VMs performed a consistency check by launching the mysqld process. Once this completed, the application resumed processing requests. Table 1 details the time (in seconds) required for each of these steps. In total, the time from detection until the application was active and ready to process requests took under two minutes.

TABLE 1

|  | Detach | Reattach | Boot | Total |
|---|---|---|---|---|
| Time (s) | 27 | 13 | 75 | 115 |

Figure 21:
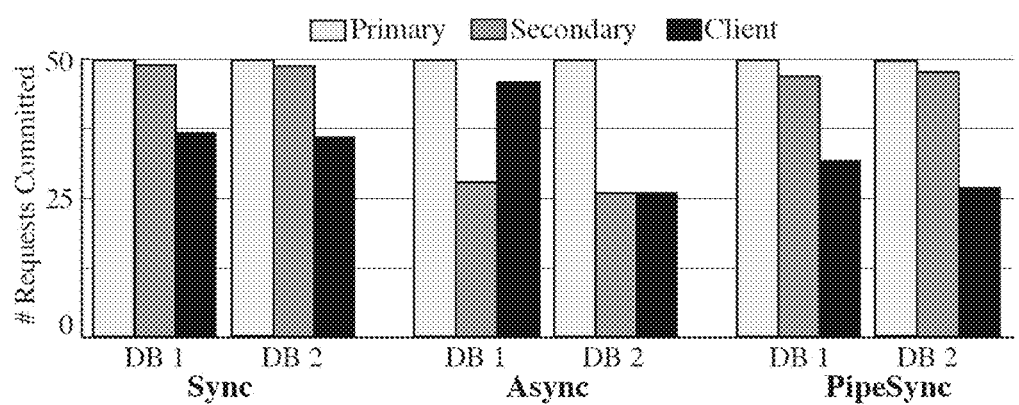

FIG. 21 shows the consistency views for the last fifty requests sent to each of the database masters prior to the failure. As in the single writer case described previously, pipelined data replication in a multi-writer disaster recovery system is able to provide the consistency guarantee that a client view will never exceed what is safely replicated to the secondary site.

The foregoing experiment illustrates the potential for automating the recovery process using cloud platforms such as EC2. The application programming interface (API) tools provided by such clouds automate steps, such as provisioning servers and reattaching storage. Moreover, the potential to reduce recovery time using cloud automation is desirable.

Figure 22:
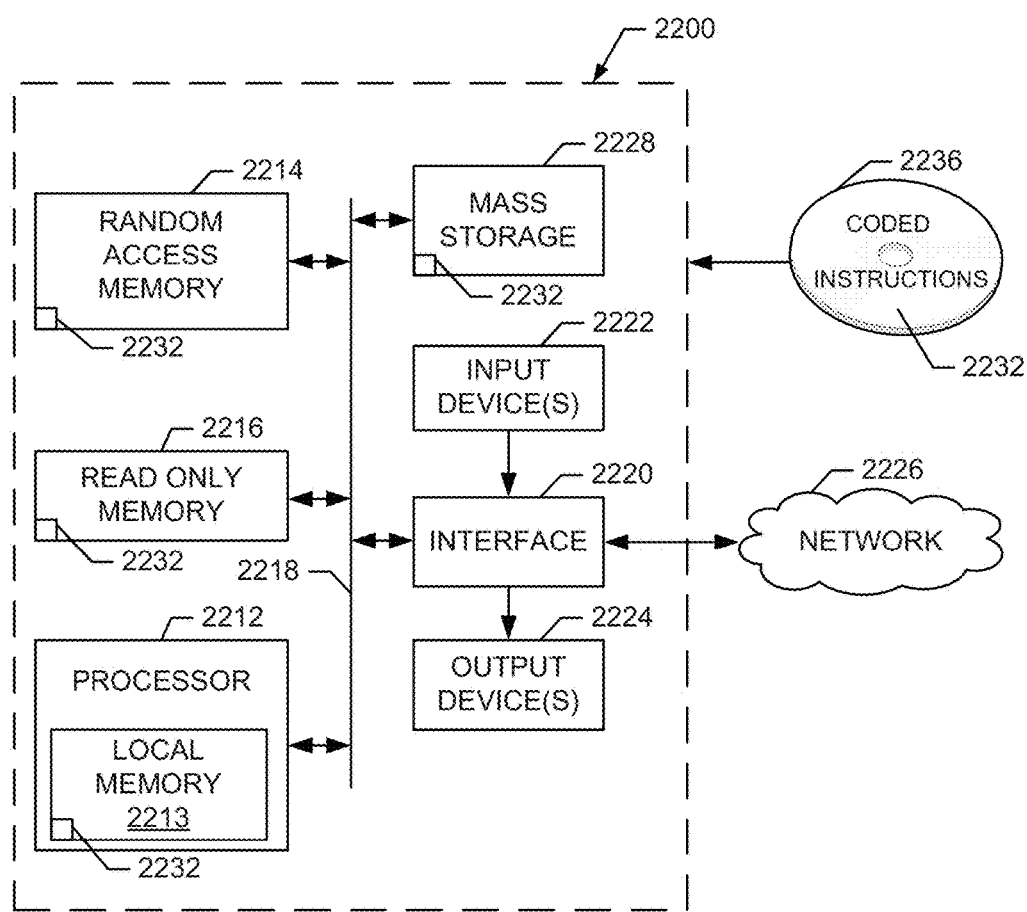
FIG. 22 is a block diagram of an example processing system that may execute the example machine readable instructions of FIGS. 12 and/or 13A-B to implement the example systems of FIGS. 1, 7-9 and/or 10.

FIG. 22 is a block diagram of an example processing system 2200 capable of executing the instructions of FIGS. 12 and/or 13A-B to implement the example systems 100, 700, 800, 900 and/or 1000, the primary processing environment 105, the example client(s) 110, the example secondary processing environment 115, the example network 120, the example local storage 125, the example remote storage 130, the example frontend web server 705, the example backend database 710, the example writer tier 805, the example intermediate tier 810, the example outbound tier 815, the example database tier 905, the example web tier 910, the example virtualization system 1005 and/or the example backup server 1010 of FIGS. The processing system 2200 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 2200 of the instant example includes a processor 2212. For example, the processor 2212 can be implemented by one or more microprocessors and/or controllers from any desired family or manufacturer.

The processor 2212 includes a local memory 2213 (e.g., a cache) and is in communication with a main memory including a volatile memory 2214 and a non-volatile memory 2216 via a bus 2218. The volatile memory 2214 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processing system 2200 also includes an interface circuit 2220. The interface circuit 2220 may be implemented by any type of interface standard, such as an Ethernet interface, a universal serial bus (USB), and/or a PCI express interface.

One or more input devices 2222 are connected to the interface circuit 2220. The input device(s) 2222 permit a user to enter data and commands into the processor 2212. The input device(s) can be implemented by, for example, a keyboard, a mouse, a touchscreen, a track-pad, a trackball, a trackbar (such as an isopoint), a voice recognition system and/or any other human-machine interface.

One or more output devices 2224 are also connected to the interface circuit 2220. The output devices 2224 can be implemented, for example, by display devices (e.g., a liquid crystal display, a cathode ray tube display (CRT)), a printer and/or speakers. The interface circuit 2220, thus, typically includes a graphics driver card.

The interface circuit 2220 also includes a communication device, such as a modem or network interface card, to facilitate exchange of data with external computers via a network 2226 (e.g., an Ethernet connection, a digital subscriber line (DSL), a telephone line, coaxial cable, a cellular telephone system, etc.).

The processing system 2200 also includes one or more mass storage devices 2228 for storing machine readable instructions and data. Examples of such mass storage devices 2228 include floppy disk drives, hard drive disks, compact disk drives and digital versatile disk (DVD) drives. In some examples, the mass storage device 2228 may implement the example local storage 125 and/or the example remote storage 130. Additionally, or alternatively, in some examples the volatile memory 2214 may implement the example local storage 125 and/or the example remote storage 130.

Coded instructions 2232 corresponding to the instructions of FIGS. 12 and/or 13A-B may be stored in the mass storage device 2228, in the volatile memory 2214, in the non-volatile memory 2216, in the local memory 2213 and/or on a removable storage medium, such as a CD or DVD 2236.

From the foregoing, example methods, apparatus and articles of manufacture to implement pipelined data replication for disaster recovery have been disclosed. As noted above, cloud computing platforms are desirable to use as backup locations for disaster recovery due to their low cost. However, the high latency between enterprise and cloud data centers can lead to unacceptable performance when using existing replication techniques. Pipelined data replication as disclosed herein can overcome the deleterious effects of speed-of-light delays by overlapping or pipelining computation with replication to a cloud site over long distance WAN links. Pipelined data replication can offer performance similar to asynchronous replication with the same guarantees to clients as provided by synchronous replication. Pipelined data replication does so by ensuring network packets destined for external entities are only released once the disk writes they are dependent on have been committed at both the primary and the backup sites. The evaluation of pipelined data replication demonstrates possible performance benefits over synchronous replication both in throughput and response time for a variety of workloads. In some examples, MySQL database throughput goes up by more than an order of magnitude and the median response time for the TPC-W web application drops by a half. Examining failures also shows pipelined data replication can deliver high performance coupled with the proper consistency in the client's view of storage.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method comprising:
   receiving, at a primary processing environment comprising a processor, from a client, a processing request;
   performing, by the processor of the primary processing environment, initial computations on the processing request to generate data to be backed up by a secondary processing environment;
   writing, by the processor of the primary processing environment, the data to a local storage associated with the primary processing environment;
   incrementing, by the processor of the primary processing environment, a value of a first counter associated with the primary processing environment when the data is written to the local storage; and after the data is written to the local storage associated with the primary processing environment,
- replicating, by the processor of the primary processing environment, the data to create replicated data,
- sending, by the processor of the primary processing environment, the replicated data to the secondary processing environment for backup of the replicated data by the secondary processing environment upon receipt of the replicated data,
- performing, by the processor of the primary processing environment, continued computations on the processing request, wherein at least a portion of the continued computations are performed on the processing request by the processor of the primary processing environment while the replicated data is being backed up by the secondary processing environment,
- preparing, by the processor of the primary processing environment, a reply to the processing request, wherein the reply comprises results of the initial computations on the processing request and the continued computations on the processing request, wherein at least a portion of the results of the reply are prepared while the replicated data is being backed up by the secondary processing environment,
- tagging, by the processor of the primary processing environment, the reply with a tag value, the tag value based on at least the value of the first counter of the primary processing environment when the reply is prepared,
- receiving, by the processor of the primary processing environment, from the secondary processing environment, a value of a second counter of the secondary processing environment, wherein the second counter is incremented as the replicated data is backed up by the secondary processing environment, and
- preventing, by the processor of the primary processing environment, the reply from being sent to the client until the value of the second counter of the secondary processing environment is greater than the tag value of the reply.

2. The method of claim 1, wherein the primary processing environment corresponds to a multi-tiered computing system comprising a data writer processing tier, an intermediate processing tier, and an outbound processing tier, and wherein the secondary processing environment corresponds to a cloud computing service.

3. The method of claim 1, further comprising tracking an order of data writes of the data to the local storage associated with the primary processing environment.

4. The method of claim 1, wherein the value of the first counter comprises a first count vector and the value of the second counter comprises a second count vector, the first count vector comprising a plurality of elements to count local data writes of the data corresponding to a plurality of processing nodes in the primary processing environment, and the second count vector comprising a plurality of elements to be incremented by the secondary processing environment for the replicated data corresponding to the local data writes of the data performed by the plurality of processing nodes in the primary processing environment.

5. The method of claim 1, wherein the primary processing environment comprises a plurality of tiers, and wherein the method further comprises propagating the value of the first counter between the plurality of tiers of the primary processing environment, the plurality of tiers comprising at least a data writer processing tier and an outbound processing tier.

6. The method of claim 1, wherein the primary processing environment corresponds to a multi-tiered computing system comprising a data writer processing tier, an intermediate processing tier, and an outbound processing tier; wherein the first counter is associated with the data writer processing tier, a third counter is associated with the intermediate processing tier, and a fourth counter is associated with the outbound processing tier; and wherein the tag value used to tag the reply is further based on a maximum of the value of the first counter, a value of the third counter, and a value of the fourth counter when the reply is prepared.

7. A non-transitory computer readable medium that stores instructions that, when executed by a processor of a primary processing environment, cause the processor to perform operations comprising:
- receiving, from a client, a processing request;
- performing initial computations on the processing request to generate data to be backed up by a secondary processing environment;
- writing the data to a local storage associated with the primary processing environment;
- incrementing a value of a first counter associated with the primary processing environment when the data is written to the local storage; and
- after the data associated with the processing request is written to the local storage associated with the primary processing environment,
  - replicating the data to create replicated data,
  - sending the replicated data to the secondary processing environment for backup of the replicated data by the secondary processing environment upon receipt of the replicated data,
  - performing continued computations on the processing request, wherein at least a portion of the continued computations are performed on the processing request by the processor of the primary processing environment while the replicated data is being backed up by the secondary processing environment,
  - preparing a reply to the processing request, wherein the reply comprises results of the initial computations on the processing request and the continued computations on the processing request, wherein at least a portion of the results of the reply are prepared while the replicated data is being backed up by the secondary processing environment,
  - tagging the reply with a tag value, the tag value based on at least the value of the first counter of the primary processing environment when the reply is prepared,
  - receiving, from the secondary processing environment, a value of a second counter of the secondary processing environment, wherein the second counter is incremented as the replicated data is backed up by the secondary processing environment, and
  - preventing the reply from being sent to the client until the value of the second counter of the secondary processing environment is greater than the tag value of the reply.

8. The non-transitory computer readable medium of claim 7, wherein the primary processing environment corresponds to a multi-tiered computing system comprising a data writer processing tier, an intermediate processing tier, and an outbound processing tier, and wherein the secondary processing environment corresponds to a cloud computing service.

9. The non-transitory computer readable medium of claim 7, wherein the operations further comprise tracking an order of data writes of the data to the local storage associated with the primary processing environment.

10. The non-transitory computer readable medium of claim 7, wherein the value of the first counter comprises a first count vector and the value of the second counter comprises a second count vector, the first count vector comprising a plurality of elements to count local data writes of the data corresponding to a plurality of processing nodes in the primary processing environment, and the second count vector comprising a plurality of elements to be incremented by the secondary processing environment for the replicated data corresponding to the local data writes of the data performed by the plurality of processing nodes in the primary processing environment.

11. The non-transitory computer readable medium of claim 7, the primary processing environment comprises a plurality of tiers, and wherein the operations further comprise propagating the value of the first counter between the plurality of tiers of the primary processing environment, the plurality of tiers comprising at least a data writer processing tier and an outbound processing tier.

12. The non-transitory computer readable medium of claim 7, wherein the primary processing environment corresponds to a multi-tiered computing system comprising a data writer processing tier, an intermediate processing tier, and an outbound processing tier; wherein the first counter is associated with the data writer processing tier, a third counter is associated with the intermediate processing tier, and a fourth counter is associated with the outbound processing tier; and wherein the tag value used to tag the reply is further based on a maximum of the value of the first counter, a value of the third counter, and a value of the fourth counter when the reply is prepared.

13. A primary processing environment comprising:
a processor; and
a memory that stores instructions that, when executed by the processor, cause the processor to perform operations comprising
receiving, from a client, a processing request,
performing initial computations on the processing request to generate data to be backed up by a secondary processing environment,
writing the data to a local storage associated with the primary processing environment,
incrementing a value of a first counter associated with the primary processing environment when the data is written to the local storage, and
after the data is written to the local storage associated with the primary processing environment,
replicating the data to create replicated data,
sending the replicated data to the secondary processing environment for backup of the replicated data by the secondary processing environment upon receipt of the replicated data,
performing continued computations on the processing request, wherein at least a portion of the continued computations are performed on the processing request by the processor of the primary processing environment while the replicated data is being backed up by the secondary processing environment,
preparing a reply to the processing request, wherein the reply comprises results of the initial computations on the processing request and the continued computations on the processing request, wherein at least a portion of the results of the reply are prepared while the replicated data is being backed up by the secondary processing environment,
tagging the reply with a tag value, the tag value based on at least the value of the first counter of the primary processing environment when the reply is prepared,
receiving, from the secondary processing environment, a value of a second counter of the secondary processing environment, wherein the second counter is incremented as the replicated data is backed up by the secondary processing environment, and
preventing the reply from being sent to the client until the value of the second counter of the secondary processing environment is greater than the tag value of the reply.

14. The primary processing environment of claim 13, wherein the primary processing environment corresponds to a multi-tiered computing system comprising a data writer processing tier, an intermediate processing tier, and an outbound processing tier, and wherein the secondary processing environment corresponds to a cloud computing service.

15. The primary processing environment of claim 13, wherein the operations further comprise tracking an order of data writes of the data to the local storage associated with the primary processing environment.

16. The primary processing environment of claim 13, wherein the value of the first counter comprises a first count vector and the value of the second counter comprises a second count vector, the first count vector comprising a plurality of elements to count local data writes of the data corresponding to a plurality of processing nodes in the primary processing environment, and the second count vector comprising a plurality of elements to be incremented by the secondary processing environment for the replicated data corresponding to the local data writes of the data performed by the plurality of processing nodes in the primary processing environment.

17. The primary processing environment of claim 13, wherein the primary processing environment corresponds to a multi-tiered computing system comprising a data writer processing tier, an intermediate processing tier, and an outbound processing tier; wherein the first counter is associated with the data writer processing tier, a third counter is associated with the intermediate processing tier, and a fourth counter is associated with the outbound processing tier; and wherein the tag value used to tag the reply is further based on a maximum of the value of the first counter, a value of the third counter, and a value of the fourth counter when the reply is prepared.

* * * * *